United States Patent
Hikitani et al.

(10) Patent No.: US 11,181,054 B2
(45) Date of Patent: Nov. 23, 2021

(54) INTAKE-AIR TEMPERATURE CONTROLLING DEVICE FOR ENGINE

(71) Applicant: Mazda Motor Corporation, Hiroshima (JP)

(72) Inventors: Shinichi Hikitani, Hiroshima (JP); Hajime Umehara, Hiroshima (JP); Naoki Nagano, Hiroshima (JP); Kenji Sugasaki, Hiroshima (JP); Shin Kodama, Kure (JP); Hiromasa Nakagawa, Hatsukaichi (JP); Tomokuni Kusunoki, Aki-gun (JP); Taiga Kamiji, Hiroshima (JP); Masanobu Koutoku, Higashihiroshima (JP); Toshinori Ueno, Higashihiroshima (JP); Katsuya Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 122 days.

(21) Appl. No.: 16/674,365

(22) Filed: Nov. 5, 2019

(65) Prior Publication Data

US 2020/0208579 A1    Jul. 2, 2020

(30) Foreign Application Priority Data

Dec. 26, 2018 (JP) .............................. JP2018-241938

(51) Int. Cl.
*B60K 11/04* (2006.01)
*F01P 5/06* (2006.01)
(Continued)

(52) U.S. Cl.
CPC .......... *F02D 41/0002* (2013.01); *B60K 11/04* (2013.01); *F01P 3/18* (2013.01);
(Continued)

(58) Field of Classification Search
CPC .............. F02B 29/0493; F02B 29/0418; F02B 29/0431; F02D 41/0002; F02D 41/0005;
(Continued)

(56) References Cited

U.S. PATENT DOCUMENTS 6,273,076 B1 *  8/2001  Beck ................... F02D 41/1448
                                                              123/679
10,036,307 B2 *  7/2018  Hotta .................. F02B 29/0425
(Continued)

FOREIGN PATENT DOCUMENTS

EP         1707791 A2      10/2006
JP         07091235 A  *   4/1995
JP         2007056773 A    3/2007

OTHER PUBLICATIONS

Johansson, T., "Turbocharged HCCI Engine," Doctoral Thesis, Lund University, Sweden, Jan. 1, 2010, 235 pages.
(Continued)

*Primary Examiner* — Michael A Kessler
(74) *Attorney, Agent, or Firm* — Alleman Hall Creasman & Tuttle LLP

(57) ABSTRACT

An intake-air temperature controlling device for an engine is provided, which includes an engine body, an intake passage, an air intake part, an intake air temperature adjuster configured to adjust air temperature taken in through the air intake part to the passage, and a controller. An operating range in which the CI combustion is performed has a lean operating range in which A/F of mixture gas formed inside the cylinder, or G/F that is a relationship between the total weight G of gas inside the cylinder and a weight F of fuel fed to the cylinder is relatively low, and a rich operating range in which the A/F or G/F is relatively high. When the engine is in the lean operating range, the controller outputs a control signal to the intake air temperature adjuster so that
(Continued)

the air temperature is increased, as compared in the rich operating range.

5 Claims, 11 Drawing Sheets

(51) Int. Cl.
| | | |
|---|---|---|
| *F02B 9/02* | (2006.01) | |
| *F02D 41/06* | (2006.01) | |
| *F02D 41/00* | (2006.01) | |
| *F01P 3/18* | (2006.01) | |
| *F01P 7/14* | (2006.01) | |
| *F02M 35/10* | (2006.01) | |

(52) U.S. Cl.
CPC .................................... *F01P 5/06* (2013.01); *F01P 7/14* (2013.01); *F02B 9/02* (2013.01); *F02D 41/068* (2013.01); *F02M 35/10255* (2013.01); *F02M 35/10268* (2013.01); *F01P 2025/42* (2013.01); *F02D 2200/0414* (2013.01)

(58) Field of Classification Search
CPC ........... F02D 41/0007; F02D 2041/001; F02D 2041/0015; F02D 2041/0017; F02D 2041/002; F02D 2041/0022; F02M 35/10255; F02M 31/07; F02M 31/10; F02M 31/042; F02M 31/107; B60K 11/085; F01P 5/04; F01P 5/06; F01P 2005/0466
See application file for complete search history.

(56) References Cited

U.S. PATENT DOCUMENTS

| | | | | |
|---|---|---|---|---|
| 10,876,465 | B2* | 12/2020 | Hikitani | ............... F02M 31/042 |
| 2011/0132317 | A1* | 6/2011 | Ramappan | .......... F02D 41/3035 |
| | | | | 123/295 |
| 2012/0216776 | A1* | 8/2012 | Nagatsu | .............. F02D 13/0234 |
| | | | | 123/305 |
| 2014/0251252 | A1* | 9/2014 | Wasada | .................. F02M 31/20 |
| | | | | 123/184.21 |
| 2020/0208582 | A1* | 7/2020 | Hikitani | ............... F02M 31/042 |

OTHER PUBLICATIONS

European Patent Office, Extended European Search Report Issued in Application No. 19218543.7, dated May 13, 2020, Germany, 11 pages.

* cited by examiner

INTAKE-AIR TEMPERATURE CONTROLLING DEVICE FOR ENGINE

TECHNICAL FIELD

The technology disclosed herein belongs to a technical field related to an intake-air temperature controlling device for an engine.

BACKGROUND OF THE DISCLOSURE

Conventionally, adjusting the temperature of intake air introduced into an engine body based on an operating state of the engine body has been considered.

For example, JP2007-056773A discloses a controlling device for an internal combustion engine including a means for starting intake air heating by a heater provided to an intake passage when a switching request from jump-spark-ignition combustion to compression ignition combustion is received, a means for increasing an exhaust gas recirculation (EGR) rate by an EGR device during the jump-spark-ignition combustion in response to an increase in the intake air temperature by the intake air heating, and a means for actually switching from the jump-spark-ignition combustion to the compression ignition combustion when the intake air temperature reaches a target temperature.

Meanwhile, in recent years, in terms of improving the fuel efficiency, the engine may be operated in a lean operating range in which an air-fuel ratio (A/F) of a mixture gas formed inside the cylinder, or a gas-fuel ratio (G/F) which is a relationship between the total gas weight G inside the cylinder and the weight F of fuel fed to the cylinder, is low. When the mixture gas inside the cylinder is lean, it is desirable to keep the temperature of the mixture gas high at a start of a compression, in order to obtain stable flammability. In the engine which performs compression ignition (CI) combustion in which compression self-ignition of the mixture gas comprised of fuel and intake air is performed in the lean operating range, the temperature of the mixture gas when the compression starts is especially important.

Like JP2007-056773A, it is also considered that an intake air heating device is disposed in the intake passage, and intake air flowing through the intake passage is heated in the lean operating range. However, in JP2007-056773A, since the outside air is taken into the intake passage as it is, when the ambient temperature is low, there is a possibility that the intake air cannot fully be heated. If the heating of intake air is not enough, the temperature of the mixture gas when the compression starts becomes low, and, therefore, there is a possibility that the mixture gas may not be able to perform a compression self-ignition.

SUMMARY OF THE DISCLOSURE

The technology disclosed herein is made in view of the situation, and one purpose thereof is to increase the temperature of a mixture gas when a compression starts in a lean operating range within an operating range where compression ignition (CI) combustion is performed, thereby improving combustion stability in the lean operating range.

According to one aspect of the present disclosure, an intake-air temperature controlling device for an engine is provided, which includes an engine body having a cylinder, an intake passage connected to the engine body, an air intake part configured to take air into the intake passage, an intake air temperature adjuster configured to adjust a temperature of air taken in through the air intake part to the intake passage, and a controller comprised of circuitry and configured to control the intake air temperature adjuster, the controller storing beforehand, as an operating range at least after a warm-up of the engine body, an operating range in which CI combustion in which a compression self-ignition of mixture gas comprised of fuel and intake air is performed. The operating range in which the CI combustion is performed has a lean operating range in which an air-fuel ratio (A/F) of a mixture gas formed inside the cylinder, or a gas-fuel ratio (G/F) that is a relationship between the total weight G of gas inside the cylinder and a weight F of fuel fed to the cylinder is relatively low, and a rich operating range in which the A/F or G/F is relatively high. When the controller determines that an operating state of the engine body is in the lean operating range, the controller outputs a control signal to the intake air temperature adjuster so that the temperature of the air taken in through the air intake part to the intake passage is increased, as compared with a case when determining that the operating state of the engine body is in the rich operating range.

According to this configuration, when the engine body is in the operating range in which CI combustion is performed, and the operating state of the engine body is in the lean operating range, air at a temperature as high as possible can be taken into the intake passage. Thus, since the intake air at the temperature as high as possible is introduced into the engine body when the engine body is in the operating range in which CI combustion is performed, and the operating state of the engine body is in the lean operating range, a temperature of the mixture gas when compression starts can be increased. As a result, combustion stability in the lean operating range can be improved.

The intake-air temperature controlling device may further include a radiator through which coolant configured to cool the engine body circulates. The air intake part may include a first air intake part located forward of the radiator, and a second air intake part located rearward of the radiator and configured to take air into the intake passage after passing through the radiator and exchanging heat with the coolant. The intake air temperature adjuster may include an intake air adjusting valve configured to adjust a ratio of an amount of air taken in through the first air intake part to the intake passage to an amount of air taken in through the second air intake part to the intake passage. In the operating range where the engine body performs the CI combustion, when the operating state of the engine body is in the lean operating range, the controller may output a control signal to the intake air adjusting valve so that the ratio of the amount of air taken in through the second air intake part to the intake passage is increased, as compared with the case when the operating state of the engine body is in the rich operating range.

According to this configuration, the first air intake part takes into the intake passage, air before passing through the radiator which is at the same temperature as ambient temperature. On the other hand, the second air intake part takes into the intake passage, air heated by heat exchange with the coolant circulating the radiator. Thus, when the ratio of the amount of air taken in through the second air intake part to the intake passage is increased, the air at the temperature as high as possible can be taken into the intake passage. Thus, when the operating state in the lean operating range within the operating range where CI combustion is performed, the air at the temperature sufficiently higher than the ambient temperature can be taken into the intake passage. As a result, in the lean operating range within the operating range where CI combustion is performed, the temperature of the mixture gas when compression starts can be more effectively increased, thereby further improving combustion stability in the lean operating range.

The intake air temperature adjuster may further include a fluid temperature adjuster configured to adjust a temperature of the coolant flowing into the radiator. In the operating range where the engine body performs the CI combustion, when the operating state of the engine body is in the lean operating range, the controller may output a control signal to the fluid temperature adjuster so that the temperature of the coolant circulating the radiator becomes higher, as compared with the case when the operating state of the engine body is in the rich operating range.

According to this configuration, the temperature of air taken into the intake passage from the second air intake part can be increased more efficiently. Thus, when the engine body is in the operating range in which CI combustion is performed, and the operating state of the engine body is in the lean operating range, the air at the temperature sufficiently higher than the ambient temperature can be more efficiently taken into the intake passage. As a result, in the lean operating range within the operating range where CI combustion is performed, the temperature of the mixture gas when compression starts can be increased further effectively, thereby further improving combustion stability in the lean operating range.

The intake air temperature adjuster may further include a grille shutter provided forward of the radiator and configured to adjust a flow rate of air taken into an engine bay, and a fan provided rearward of the radiator and forward of the second air intake part and configured to draw air into the engine bay. In the operating range where the engine body performs the CI combustion, when the operating state of the engine body is in the lean operating range, the controller may output a control signal to at least one of the grille shutter and the fan so that at least one of an opening of the grille shutter and a rotational speed of the fan is reduced, as compared with the case when the operating state of the engine body is in the rich operating range.

According to this configuration, since the grille shutter and fan are generally provided to a vehicle, no additional equipment is necessary. When at least one of the opening of the grille shutter and the rotational speed of the fan is reduced, the flow rate of air passing through the radiator decreases. When the flow rate of air passing through the radiator decreases, air passing through the radiator is uniformly heated by heat exchange with the engine coolant circulating the radiator. Therefore, the temperature of air taken into the intake passage through the second air intake part can be increased further efficiently with a simple configuration. Therefore, in the lean operating range within the operating range where CI combustion is performed, the temperature of the mixture gas when compression starts can be increased further effectively, thereby further improving combustion stability in the lean operating range.

DETAILED DESCRIPTION OF THE DISCLOSURE

Hereinafter, one exemplary embodiment is described in detail with reference to the accompanying drawings.

Figure 1:
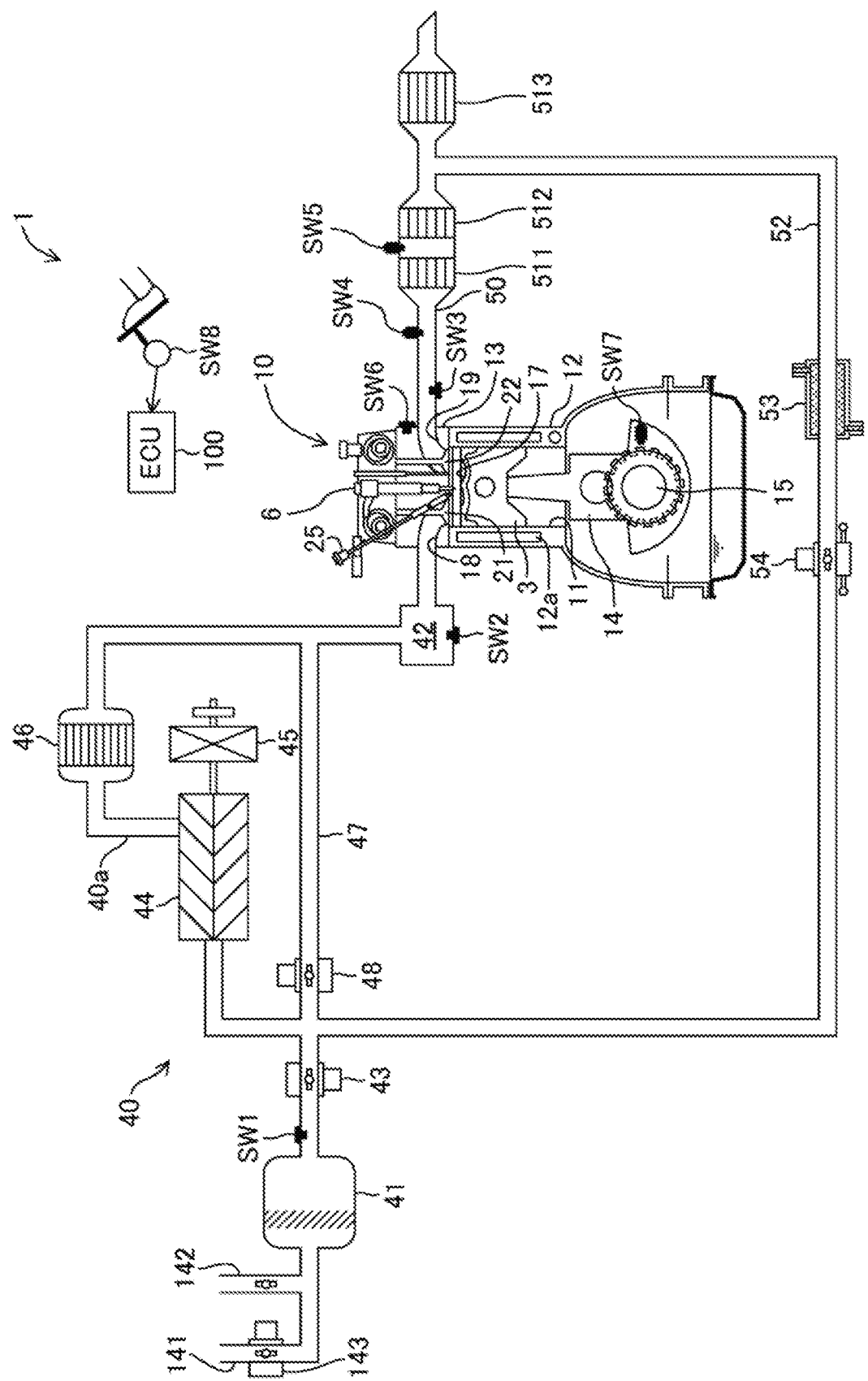
FIG. 1 is an outline configuration view of an engine provided with an intake-air temperature controlling device according to one embodiment.

FIG. 1 illustrates a configuration of an engine 1 with a supercharger, to which an intake-air temperature controlling device according to this embodiment is applied (hereinafter, simply referred to as "the engine 1"). The engine 1 is a four-stroke engine which operates by a combustion chamber 17 repeating an intake stroke, a compression stroke, an expansion stroke, and an exhaust stroke. The engine 1 is mounted on a vehicle (here, an automobile) with four wheels. The vehicle is propelled by the engine 1. Fuel of the engine 1 is liquid fuel of which the main component is gasoline in this configuration example.

(Configuration of Engine)

The engine 1 is provided with an engine body 10 having a cylinder block 12 and a cylinder head 13 placed thereon. The engine body 10 is a multi-cylinder engine in which a plurality of cylinders 11 are formed inside the cylinder block 12. In FIG. 1, only one cylinder 11 is illustrated. Other cylinders 11 of the engine body 10 are lined up in a direction perpendicular to the drawing sheet surface of FIG. 1.

A piston 3 is slidably inserted in each cylinder 11. The piston 3 is coupled to a crankshaft 15 through a connecting rod 14. The piston 3 defines the combustion chamber 17 together with the cylinder 11 and the cylinder head 13. Note that the "combustion chamber" is not limited to a space thereof when the piston 3 is located at a compression top dead center. Therefore, the term "combustion chamber" may be used in a broader sense. That is, the "combustion chamber" may mean the space formed by the piston 3, the cylinder 11, and the cylinder head 13, regardless of the position of the piston 3.

A water jacket 12a is formed in the perimeter of each cylinder 11 in the cylinder block 12. Engine coolant which cools the engine body 10 circulates inside the water jacket 12a. Although detailed illustration is omitted, after passing through the water jacket 12a, the engine coolant passes through a water jacket formed in the cylinder head 13, and flows out of the engine body 10.

An intake port 18 is formed in the cylinder head 13 for every cylinder 11. The intake port 18 communicates with the combustion chamber 17. An intake valve 21 is disposed in the intake port 18. The intake valve 21 opens and closes an intake passage between the combustion chamber 17 and the intake port 18. The intake valve 21 is opened and closed at a given timing by a valve operating mechanism. The valve operating mechanism may be a variable valve operating mechanism which varies a valve timing and/or a valve lift. In this embodiment, the variable valve operating mechanism has an intake electric S-VT (Sequential-Valve Timing) 23 (refer to FIG. 4). The intake electric S-VT 23 is configured to continuously change a rotation phase of an intake cam shaft within a given angle range. Therefore, an open timing and a close timing of the intake valve 21 are continuously changed. Note that the intake valve operating mechanism may have a hydraulic S-VT, instead of the electric S-VT.

An exhaust port 19 is formed in the cylinder head 13 for every cylinder 11. The exhaust port 19 communicates with the combustion chamber 17. An exhaust valve 22 is disposed in the exhaust port 19. The exhaust valve 22 opens and closes an exhaust passage between the combustion chamber 17 and the exhaust port 19. By the valve operating mechanism, the exhaust valve 22 is opened and closed at a given timing. This valve operating mechanism may be a variable valve operating mechanism which varies a valve timing and/or a valve lift. In this embodiment, the variable valve operating mechanism has an exhaust electric S-VT 24 (refer to FIG. 4). The exhaust electric S-VT 24 is configured to continuously change a rotation phase of an exhaust cam shaft within a given angle range. Thus, an open timing and a close timing of the exhaust valve 22 are changed continuously. Note that the exhaust valve operating mechanism may have a hydraulic S-VT, instead of the electric S-VT.

An injector 6 which directly injects fuel into the cylinder 11 is attached to the cylinder head 13 for every cylinder 11. The injector 6 is disposed so that its nozzle holes face the combustion chamber 17 from a center part of a ceiling surface of the combustion chamber 17 (in detail, a part slightly at the exhaust side from the center). The injector 6 directly injects an amount of fuel according to the operating state of the engine body 10 into the combustion chamber 17 at an injection timing set according to the operating state of the engine body 10.

An ignition plug 25 is attached to the cylinder head 13 for every cylinder 11. The ignition plug 25 forcibly ignites a mixture gas inside the combustion chamber 17. In this embodiment, the ignition plug 25 is disposed at the intake side. Electrodes of the ignition plug 25 face the inside of the combustion chamber 17, and are located near the ceiling surface of the combustion chamber 17. Note that the ignition plug 25 may be disposed at the exhaust side. Moreover, while disposing the ignition plug 25 on the center axis of the cylinder 11, the injector 6 may be disposed at the intake side or the exhaust side of the center axis of the cylinder 11.

In this embodiment, the geometric compression ratio of the engine body 10 is set as 13:1 or more and 30:1 or less. As will be described later, in the entire operating range after a warm-up of the engine 1, the engine 1 performs SPCCI (SPark Controlled Compression Ignition) combustion which is a combination of SI (Spark Ignition) combustion in which the mixture gas of fuel and intake air is ignited by jump-spark ignition by the ignition plug 25 and CI (Compression Ignition) combustion in which the mixture gas of fuel and intake air is ignited by compression self-ignition. That is, the engine 1 has an operating range in which CI combustion is performed as the operating range at least after warm-up of the engine body 10. SPCCI combustion controls CI combustion by utilizing generation of heat and a pressure buildup by SI combustion. The geometric compression ratio of the engine 1 may be set as 14 to 17 in a regular gasoline specification (the octane number of fuel is about 91), and may also be set as 15 to 18 in a high-octane specification (the octane number of fuel is about 96).

Figure 2:
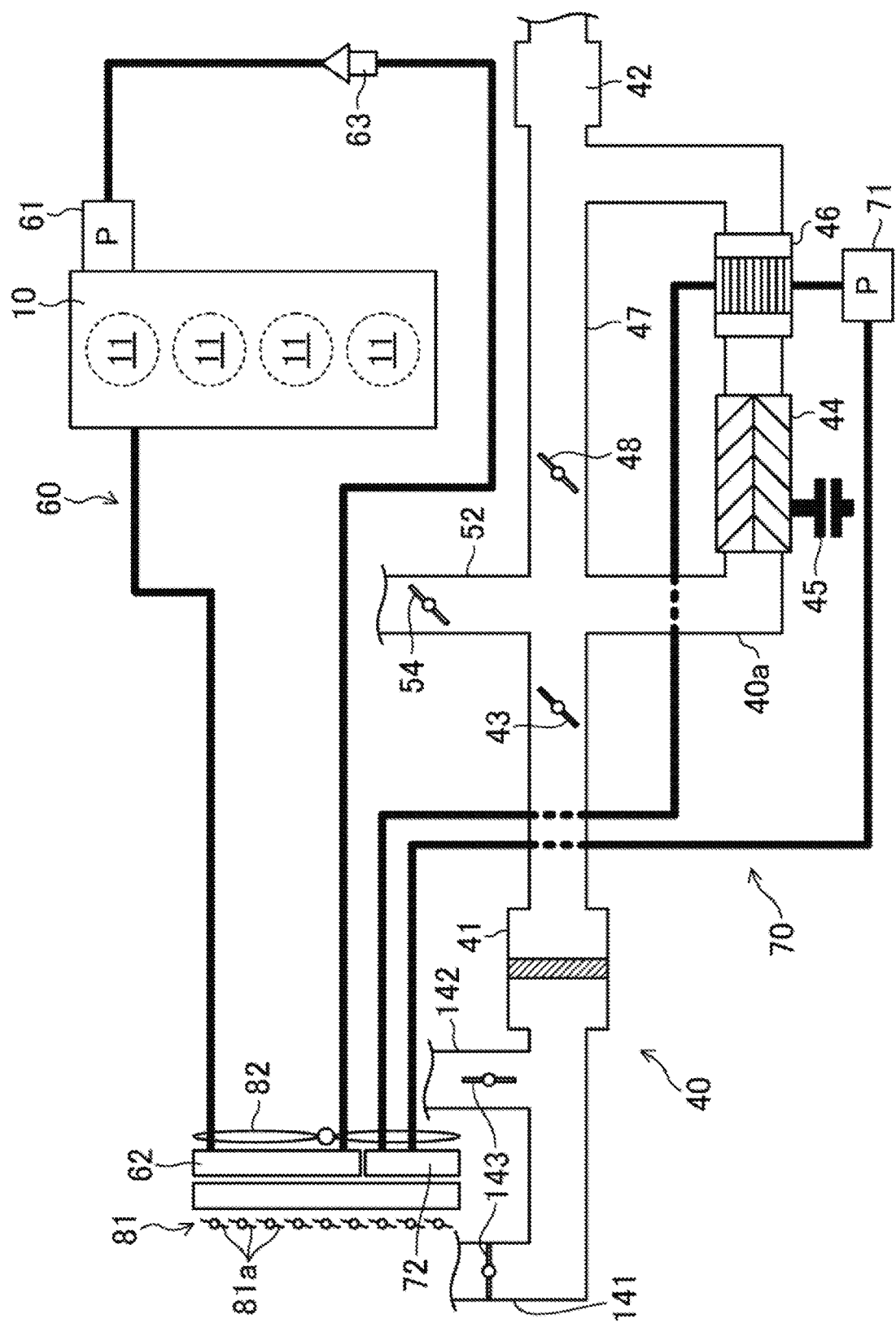
FIG. 2 is a view schematically illustrating a part of a cooling system of the engine.

An intake passage 40 is connected to one side of the engine body 10. The intake passage 40 communicates with the intake port 18 of each cylinder 11. The intake passage 40 is a passage through which intake air introduced into the combustion chamber 17 circulates. As illustrated in FIGS. 1 and 2, the intake passage 40 according to this embodiment has a first air intake part 141 which takes air at a relatively low temperature into the intake passage 40 as fresh air, and a second air intake part 142 which takes air at a relatively high temperature into the intake passage 40 as fresh air. In detail, while the first air intake part 141 takes the fresh air at the same temperature as the ambient temperature into the intake passage 40, the second air intake part 142 takes in the fresh air at a temperature higher than the ambient temperature into the intake passage 40. The configurations of the air intake parts 141 and 142 will be described later.

An air cleaner 41 which filters the fresh air is disposed in the intake passage 40 at a part immediately downstream of the air intake parts 141 and 142. A surge tank 42 is disposed near the downstream end of the intake passage 40. A part of the intake passage 40 downstream of the surge tank 42 constitutes independent passages branched for every cylinder 11. The downstream end of the independent passage is connected to the intake port 18 of each cylinder 11.

A throttle valve 43 is disposed between the air cleaner 41 and the surge tank 42 in the intake passage 40. The throttle valve 43 varies an opening of a valve to adjust an amount of fresh air introduced into the combustion chamber 17.

A supercharging side passage 40a where a compressor of a mechanical supercharger 44 (hereinafter, simply referred to as the "supercharger 44") is disposed downstream of the throttle valve 43 is provided in the intake passage 40. The supercharger 44 boosts intake air introduced into the combustion chamber 17. In this embodiment, the supercharger 44 is a supercharger which is driven by the engine body 10. The supercharger 44 may be a Lysholm type, for example. The configuration of the supercharger 44 is not limited in particular. The supercharger 44 may also be a root type, a vane type, or a centrifugal type.

An electromagnetic clutch 45 is provided between the supercharger 44 and the engine body 10. The electromagnetic clutch 45 transmits a driving force from the engine body 10 to the supercharger 44, or intercepts the transmission of the driving force between the supercharger 44 and the engine body 10. As will be described later, an ECU 100 switches the disconnection (interception) and the connection (transmission) of the electromagnetic clutch 45 to switch the supercharger 44 between a driving state and a non-driving state. That is, the electromagnetic clutch 45 is a clutch which switches the driving and the non-driving of the supercharger 44. The engine 1 is configured to switch between the supercharger 44 boosting intake air introduced into the combustion chamber 17 and the supercharger 44 not boosting intake air introduced into the combustion chamber 17.

An intercooler 46 is disposed immediately downstream of the supercharger 44 in the supercharging side passage 40a. The intercooler 46 cools intake air compressed by the supercharger 44. In this embodiment, the intercooler 46 is of a fluid-cooling type, and intercooler coolant circulates therethrough. The intercooler coolant is coolant different from the engine coolant.

A bypass passage 47 is connected to the intake passage 40. The bypass passage 47 connects a part of the intake passage 40 upstream of the supercharger 44 to a part downstream of the intercooler 46 so as to bypass the supercharger 44 and the intercooler 46. An air bypass valve 48 which opens and closes the bypass passage 47 is disposed in the bypass passage 47. In this embodiment, the air bypass valve 48 is an on-off valve.

When the supercharger 44 is not driven (i.e., when the electromagnetic clutch 45 is disconnected), the air bypass valve 48 is made into an open state (ON state). Therefore, gas which flows through the intake passage 40 bypasses the supercharger 44, and is introduced into the combustion chamber 17 of the engine 1. The engine 1 is operated in a non-boosted state (i.e., a natural aspirated state).

When the supercharger 44 is driven (i.e., when the electromagnetic clutch 45 is connected) while the air bypass valve 48 is opened, intake air flows into the supercharging side passage 40a after passing through the throttle valve 43. A portion of the intake air which passed through the supercharger 44 of the supercharging side passage 40a flows back to the upstream side of the supercharger 44 through the bypass passage 47. At this time, an amount of intake air according to the engine specification is introduced into the combustion chamber 17 of the engine body 10, similar to the non-driving state of the supercharger 44. Therefore, even if the supercharger 44 is driven, intake air can be introduced into the combustion chamber 17 in the non-boosted state. Note that the phrase "when supercharging or boosting" as used herein refers to a case where the pressure inside the surge tank 42 exceeds the atmospheric pressure, and the phrase "when not supercharging or not boosting" as used herein refers to a case where the pressure inside the surge tank 42 becomes below the atmospheric pressure.

On the other hand, when the supercharger 44 is driven while the air bypass valve 48 is closed (OFF state), intake air is introduced into the combustion chamber 17 in the boosted state. The amount of intake air at this time is more than an amount of intake air introduced into the combustion chamber 17 in the non-boosted state. Note that the air bypass valve 48 may be comprised of a valve which can continuously vary the valve opening.

An exhaust passage 50 is connected to the other side of the engine body 10. The exhaust passage 50 communicates with the exhaust port 19 of each cylinder 11. The exhaust passage 50 is a passage through which exhaust gas is discharged from the combustion chamber 17 circulates. Although detailed illustration of an upstream part of the exhaust passage 50 is omitted, it constitutes independent passages branched for every cylinder 11. The upstream end of the independent passage is connected to the exhaust port 19 of each cylinder 11.

An exhaust gas purification system having a plurality of catalytic converters is disposed in the exhaust passage 50. Although illustration of an upstream catalytic converter is omitted, it is disposed in an engine bay. The upstream catalytic converter has a three-way catalyst 511 and a GPF (Gasoline Particulate Filter) 512. A downstream catalytic converter is disposed outside the engine bay. The downstream catalytic converter has a three-way catalyst 513. Note that the exhaust gas purification system is not limited to the illustrated configuration. For example, the GPF may be omitted. Moreover, the catalytic converter is not limited to those having the three-way catalyst. Further, the disposed order of the three-way catalyst and the GPF may be change suitably.

An EGR passage 52 which constitutes an external EGR system is connected between the intake passage 40 and the exhaust passage 50. The EGR passage 52 is a passage which recirculates a portion of exhaust gas to the intake passage 40. The upstream end of the EGR passage 52 is connected to the exhaust passage 50 between the upstream catalytic converter and the downstream catalytic converter. The downstream end of the EGR passage 52 is connected to the intake passage 40 at a location upstream of the supercharger 44. Exhaust gas which flows through the EGR passage 52 (hereinafter, referred to as the "EGR gas") enters into the intake passage 40 upstream of the supercharger 44, without passing through the air bypass valve 48 of the bypass passage 47, when introduced into the intake passage 40.

An EGR cooler 53 of a fluid cooling type is disposed in the EGR passage 52. The EGR cooler 53 cools the EGR gas passing through the EGR passage 52. An EGR valve 54 is disposed in the EGR passage 52. The EGR valve 54 is configured to adjust a flow rate of the EGR gas which flows through the EGR passage 52. By varying the opening of the EGR valve 54, a recirculating amount of the cooled EGR gas can be adjusted. The EGR valve 54 may be comprised of an on-off valve, or may be comprised of a valve which can continuously vary the valve opening.

(Cooling System of Engine)

Next, a cooling system of the engine 1 is described. As illustrated in FIG. 2, the cooling system of the engine 1 includes a first cooling path 60 which cools the engine body 10 by circulating the engine coolant in the engine body 10, and a second cooling path 70 which cools intake air after passing through the supercharger 44 by circulating the intercooler coolant in the intercooler 46.

The first cooling path 60 is provided with a first pump 61, a first radiator 62 configured to cool the engine coolant which flows through the first cooling path 60, and a flow rate control valve 63 which adjusts a flow rate of the engine coolant circulating through the first cooling path 60.

The first pump 61 is a mechanical pump which is driven by the crankshaft 15 of the engine body 10 in an interlocked manner. A discharge port of the first pump 61 is connected to the water jacket 12a of the engine body 10.

The first radiator 62 cools the engine coolant which passes through the water jacket of the engine body 10 and is discharged from the cylinder head 13. The first radiator 62 cools the engine coolant by outside air when a vehicle to which the engine 1 is mounted travels forward.

The flow rate control valve 63 is disposed at an intermediate location of a path through which the engine coolant which is discharged from the first radiator 62 and flows into the first pump 61 passes. That is, the flow rate control valve 63 is disposed at the entrance side into the engine body 10 in the first cooling path 60. In this embodiment, the flow rate control valve 63 is comprised of an electric thermostat valve. In detail, the flow rate control valve 63 is a valve in which a heating wire is built into the thermostat valve. Fundamentally, when the temperature of the engine coolant is above a preset fluid temperature setting, the flow rate control valve 63 is configured to open according to the temperature. However, by applying electric current to the heating wire, it can open even when the temperature of the engine coolant is below the fluid temperature setting.

Figure 3:
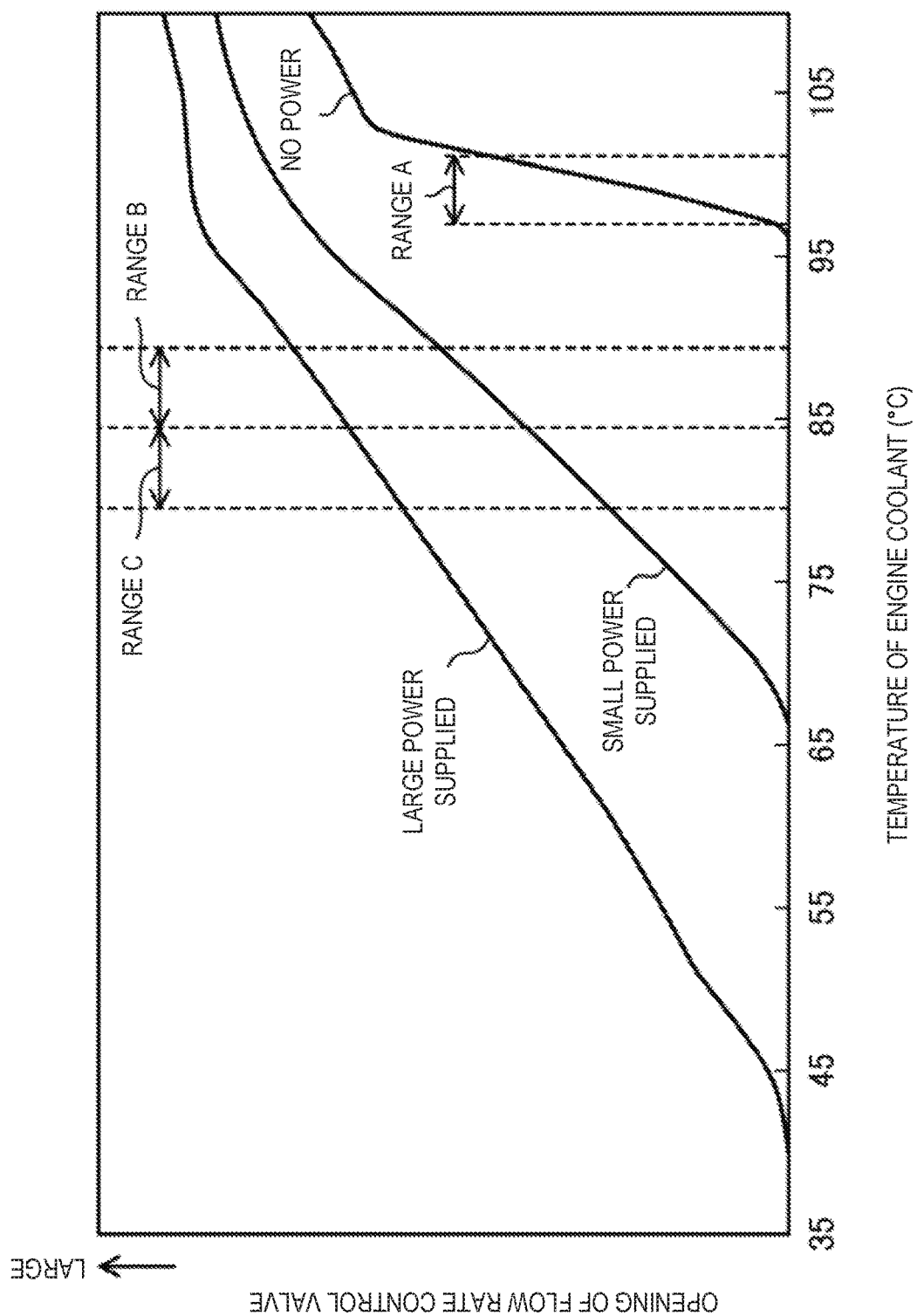
FIG. 3 is a graph illustrating one example of a characteristic of a flow rate control valve to temperature of engine coolant.

FIG. 3 illustrates one example of a characteristic of the flow rate control valve 63 to the temperature of the engine coolant. In FIG. 3, the temperature of the engine coolant illustrated on the horizontal axis is the temperature at the location of the flow rate control valve 63, and it differs from the temperature of the engine coolant which flows into the first radiator 62.

As illustrated in FIG. 3, during the power being not supplied, the flow rate control valve 63 begins to open when the temperature of the engine coolant is 95° C. to 96° C. On the other hand, during the power is supplied, it can open even if the temperature of the engine coolant is below 95° C. As illustrated in FIG. 3, the temperature at which the flow rate control valve 63 begins to open is lowered as the current supplied to the heating wire increases. Moreover, the opening of the flow rate control valve 63 while the temperature is constant can be increased as the current supplied to the heating wire increases, within a range of the opening of the flow rate control valve 63 being smaller than a fully opened state. Note that in this embodiment, the fluid temperature setting is set as 95° C. to 97° C. Moreover, the flow rate control valve 63 may be an electromagnetic valve, such as a solenoid valve, instead of the thermostat valve.

The power supplied to the flow rate control valve 63 is adjusted based on the operating state of the engine body 10, the ambient temperature, etc. so that the temperature of the engine coolant becomes a suitable temperature.

Note that although illustration is omitted, the first cooling path 60 also passes through the EGR cooler 53. That is, the EGR gas passing through the EGR passage 52 is cooled by heat exchange with the engine coolant.

The second cooling path 70 is provided with a second pump 71, and a second radiator 72 which cools the intercooler coolant which flows through the second cooling path 70.

The second pump 71 is an electric pump driven by electric power. The second pump 71 is configured to increase a discharging amount of the intercooler coolant as the supplied electric power increases.

The second radiator 72 cools the intercooler coolant discharged from the intercooler 46. The second radiator 72 is disposed below and adjacent to the first radiator 62. The second radiator 72 cools the intercooler coolant by outside air when the vehicle to which the engine 1 is mounted travels forward. The intercooler coolant cooled by the second radiator 72 flows into the second pump 71.

The cooling system of the engine 1 includes a grille shutter 81 and a radiator fan 82, as a mechanism to send the outside air to the first and second radiators 62 and 72.

The grille shutter 81 is provided to a location of the vehicle forward of the first and second radiators 62 and 72. The grille shutter 81 adjusts a flow rate of air taken in into the engine bay where the engine 1 is disposed. The grille shutter 81 is comprised of a plurality of flappers 81a which rotate on respective axes extending in the vehicle width direction. The grille shutter 81 is fully opened when the flappers 81a become perpendicular to the vertical direction, and is fully closed when the flappers 81a become substantially parallel to the vertical direction. A flow rate of the air taken in into the engine bay, i.e., an amount of the outside air which flows to the first and second radiators 62 and 72, is adjusted by the angle of the flappers 81a with respect to the vertical direction. The angle of the flappers 81a with respect to the vertical direction (i.e., an opening of the grille shutter 81) is adjustable electrically. Note that the term "vertical direction" as used herein refers to the up-and-down direction of the vehicle 1 and normally corresponds to a direction perpendicular to a road surface. The grille shutter 81 constitutes a part of an intake air temperature adjuster and a fluid temperature adjuster. Note that "forward" and "rearward" in the vehicle mean the directions when the vehicle is oriented normally.

The radiator fan 82 is provided rearward of the first and second radiators 62 and 72 and forward of the second air intake part 142. The radiator fan 82 draws the outside air into the engine bay by rotating to assist the outside air to flow through the first and second radiators 62 and 72. The radiator fan 82 is configured to increase a drawing amount of the outside air as its rotational speed increases. The radiator fan 82 is configured to be electrically adjustable of the rotational speed. The radiator fan 82 constitutes a part of the intake air temperature adjuster and the fluid temperature adjuster.

The outside air taken in through the grille shutter 81 cools the coolant which flows through the first and second radiators 62 and 72 by heat exchange with the coolant. The outside air which passed through the first and second radiators 62 and 72 flows rearward of the radiator fan 82.

(Fresh Air Intake Structure of Intake Passage)

As described above, in this embodiment, the intake passage 40 has the two air intake parts comprised of the first and second air intake parts 141 and 142. As illustrated in FIG. 2, the first air intake part 141 is located forward of the radiators 62 and 72, in more detail, forward of the grille shutter 81. The first air intake part 141 takes in the outside air (air not heated) to the intake passage 40. On the other hand, the second air intake part 142 is located rearward of the radiators 62 and 72, in more detail, rearward of the radiator fan 82. The second air intake part 142 takes in air (outside air), which passes through the first and second radiators 62 and 72 and flows rearward of the radiator fan 82, to the intake passage 40. That is, the second air intake part 142 takes in air, after heat exchange with the coolant which flows through the first and second radiators 62 and 72, to the intake passage 40. Thus, the second air intake part 142 takes in air, at a temperature higher than the ambient temperature, to the intake passage 40.

The first and second air intake parts 141 and 142 is provided with an intake air adjusting valve 143 which adjusts a ratio of the amount of air taken in through the first air intake part 141 to the intake passage 40 and the amount of air taken in through the second air intake part 142 to the intake passage 40. A valve of the intake air adjusting valve 143 is disposed at each of the first and second air intake parts 141 and 142, and the valves operate in an interlocked manner. In detail, the opening of the valve of the second air intake part 142 becomes smaller as the opening of the valve of first air intake part 141 becomes larger. Thus, while not changing the total amount of air taken in through the first and second air intake parts 141 and 142 by the intake air adjusting valve 143, the ratio of the air amount taken in to the intake passage 40 through the first air intake part 141 to the air amount taken in to the intake passage 40 through the second air intake part 142 can be changed. Therefore, by varying the opening of each valve, the temperature of air (fresh air) taken into the intake passage 40 can be adjusted. That is, the intake air adjusting valve 143 constitutes a part of the intake air temperature adjuster.

Although illustration is omitted, the intake air adjusting valve 143 according to this embodiment changes the opening of each valve in the interlocked manner by coupling the valves through the common axis. Note that the intake air adjusting valve 143 provided to the first air intake part 141 and the intake air adjusting valve 143 provided to the second air intake part 142 may be configured to be adjustable of the valve openings independently.

(Control System of Engine)

Figure 4:
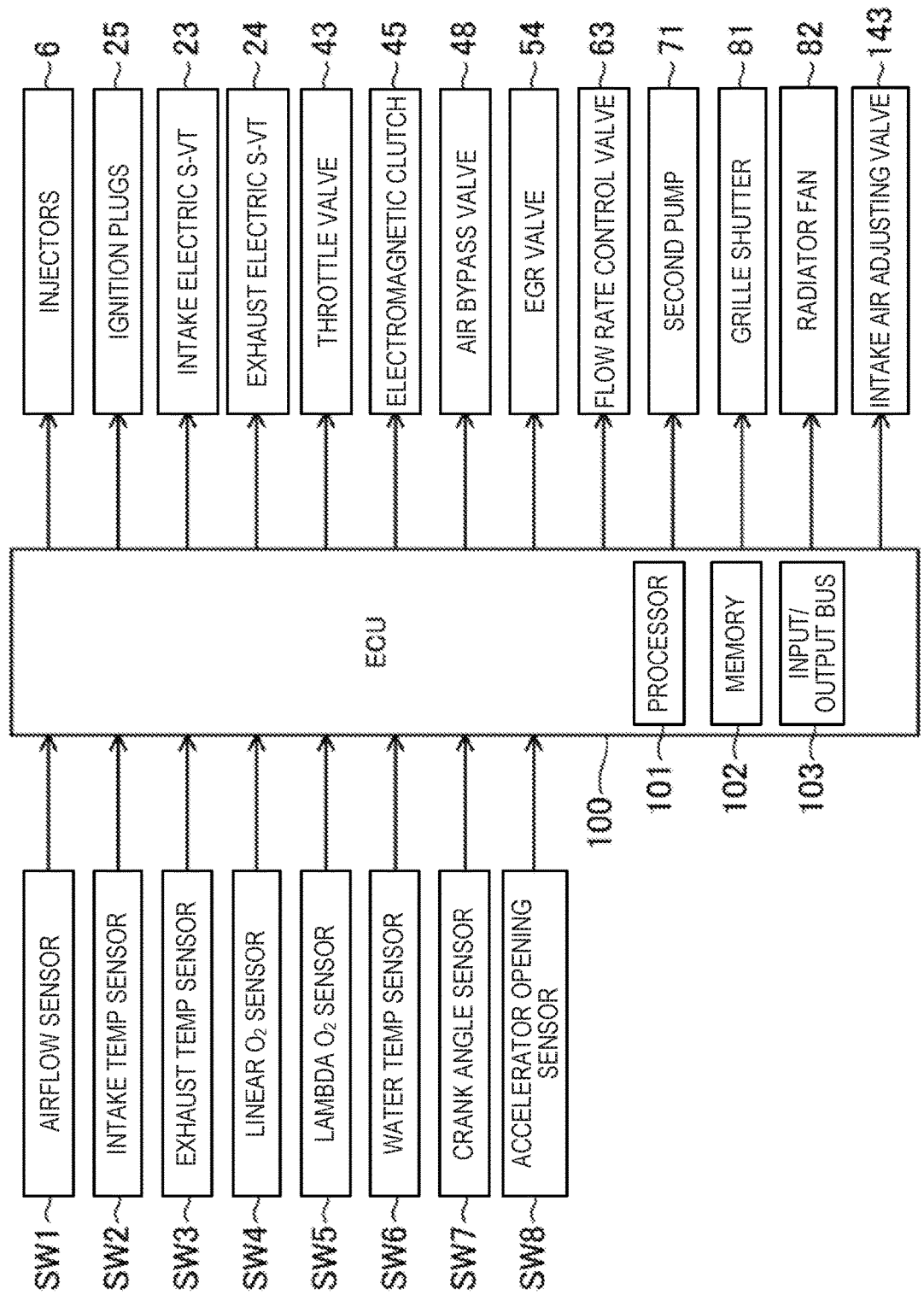
FIG. 4 is a block diagram illustrating a configuration of a controlling device of the engine.

The engine 1 is provided with the ECU (Engine Control Unit) 100 for operating the engine 1. The ECU 100 is a controller based on a well-known microcomputer, and as illustrated in FIG. 4, includes a processor (e.g., a central processing unit (CPU)) 101 which executes a program, memory 102 which is comprised of RAM (Random Access Memory) and/or ROM (Read Only Memory) for example, and stores the programs and data, and an input/output bus 103 which inputs and outputs an electrical signal. The ECU 100 is one example of the controller.

As illustrated in FIGS. 1 and 4, the ECU 100 is connected to various kinds of sensors SW1-SW8. The sensors SW1-SW8 each output a detection signal to the ECU 100. The sensors include the following sensors.

That is, an airflow sensor SW1 which is disposed downstream of the air cleaner 41 in the intake passage 40 and detects a flow rate of fresh air flowing through the intake passage 40, an intake temperature sensor SW2 which is attached to the surge tank 42 and detects the temperature of intake air supplied to the combustion chamber 17, an exhaust temperature sensor SW3 which is disposed at the exhaust passage 50 and detects the temperature of exhaust gas discharged from the combustion chamber 17, a linear $O_2$ sensor SW4 which is disposed upstream of the upstream catalytic converter in the exhaust passage 50 and detects an oxygen concentration in the exhaust gas, a lambda ($\lambda$) $O_2$ sensor SW5 which is disposed downstream of the three-way catalyst 511 in the upstream catalytic converter and detects an oxygen concentration in the exhaust gas, a fluid temperature sensor SW6 which is attached to the cylinder head 13 of the engine body 10 and detects the temperature of the engine coolant, a crank angle sensor SW7 which is attached to the engine body 10 and detects a rotation angle of the crankshaft 15, and an accelerator opening sensor SW8 which is attached to an accelerator pedal mechanism and detects an accelerator opening corresponding to an amount of operation of the accelerator pedal.

The ECU 100 determines the operating state of the engine body 10 and calculates a controlled amount (parameter) of each device based on these detection signals. The ECU 100 outputs a control signal according to the calculated controlled amount to each of the injector 6, the ignition plug 25, the intake electric S-VT 23, the exhaust electric S-VT 24, the throttle valve 43, the electromagnetic clutch 45 of the supercharger 44, the air bypass valve 48, the EGR valve 54, the flow rate control valve 63, the second pump 71, the grille shutter 81, the radiator fan 82, and the intake air adjusting valve 143.

For example, the ECU 100 calculates an engine speed of the engine body 10 based on the detection signal of the crank angle sensor SW7. The ECU 100 calculates an engine load of the engine body 10 based on the detection signal of the accelerator opening sensor SW8.

Moreover, the ECU 100 sets a target EGR rate (i.e., a ratio of the EGR gas to the entire gas inside the combustion chamber 17) based on the operating state of the engine body 10 (mainly, the engine load and the engine speed) and a preset map. Then, the ECU 100 determines a target EGR amount based on the target EGR rate and an intake air amount based on the detection signal of the accelerator opening sensor SW8. Moreover, by adjusting the opening of the EGR valve 54, the ECU 100 performs a feedback control so that the external EGR amount introduced into the combustion chamber 17 becomes the target EGR amount.

Further, the ECU 100 performs an air-fuel ratio feedback control when a given control condition is satisfied. Specifically, based on the oxygen concentrations in the exhaust gas detected by the linear $O_2$ sensor SW4 and the lambda $O_2$ sensor SW5, the ECU 100 adjusts a fuel injection amount of the injector 6 so that the air-fuel ratio of the mixture gas becomes a desired value.

(Intake-Air Temperature Control of Engine)

Figure 5:
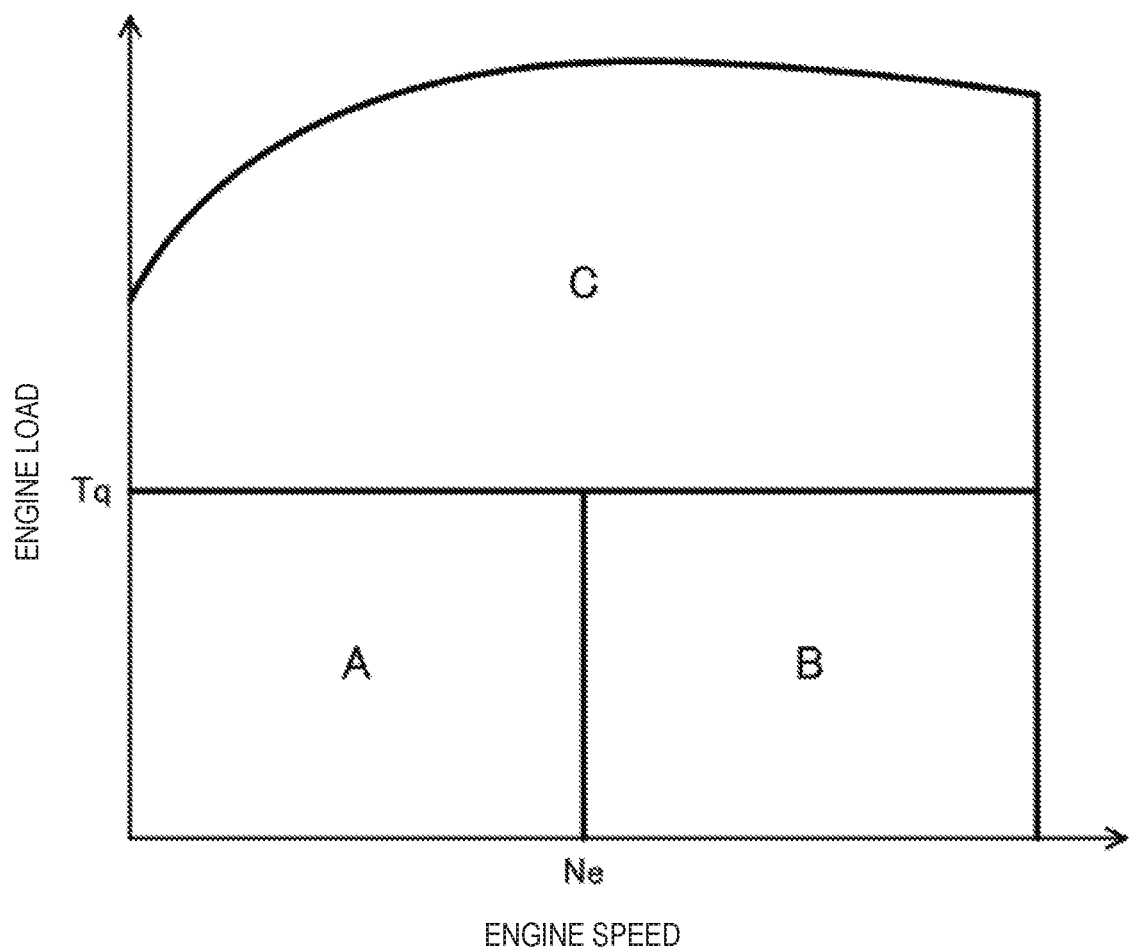
FIG. 5 is a view illustrating an operating range map of the engine.

FIG. 5 illustrates an operating range map of the engine 1 when the engine 1 is warm (i.e., after a warm-up of the engine body 10). The operating range map of the engine 1 is defined by the engine load and speed, and is divided into three ranges depending on the engine load and speed. In detail, the three ranges are comprised of a range A where an idle operation is included, the engine speed is low below a given engine speed Ne, and the engine load is low below a given load Tq, a range B where the engine speed is high above the given engine speed Ne, and the engine load is below the given load Tq, and a range C where the engine load is the given load Tq or above. Here, the given engine speed Ne may be about 3500 rpm, for example. In this embodiment, the phrase "after the warm-up of the engine body 10" as used herein refers to a state where the temperature of the engine coolant detected by the fluid temperature sensor SW6 is 80° C. or more, and the temperature of the intake air detected by the intake temperature sensor SW2 is 25° C. or more.

The engine 1 performs SPCCI combustion which is the combination of SI combustion and CI combustion in all the ranges A-C in order to mainly improve combustion stability and fuel efficiency. In order to stably perform the SPCCI combustion, the ECU 100 controls the temperature of intake air introduced into the engine body 10 by using the cooling system of the engine 1. Below, operation of the engine 1 in each range is described in detail with reference to FIGS. 6 to 9.

(Low-Load Low-Speed Range A)

While the engine body 10 operates in the range A, the engine 1 performs SPCCI combustion in a state where an air-fuel ratio (A/F) or a gas-fuel ratio (G/F) of the mixture gas inside the cylinder 11 (combustion chamber 17) is larger than a stoichiometric air-fuel ratio. In detail, fuel is injected from the injector 6 so that A/F or G/F becomes 25:1 or more, and the ignition plug 25 is operated at a desired timing. That is, the range A corresponds to a lean operating range where the air-fuel ratio (A/F) of the mixture gas formed inside the cylinder 11, or the gas-fuel ratio (G/F) which is a relationship between the total gas weight G inside the cylinder 11 and the weight F of fuel fed to the cylinder 11 is relatively low. In order to stably perform SPCCI combustion (especially, CI combustion) in the lean state, it is desirable to increase the temperature of the mixture gas inside the cylinder 11 when a compression starts. Then, the ECU 100 controls and operates each device so that intake air at or above a first intake air temperature Ta1 is introduced into the engine body 10. Note that the first intake air temperature Ta1 is about 80° C., for example.

Figure 6:
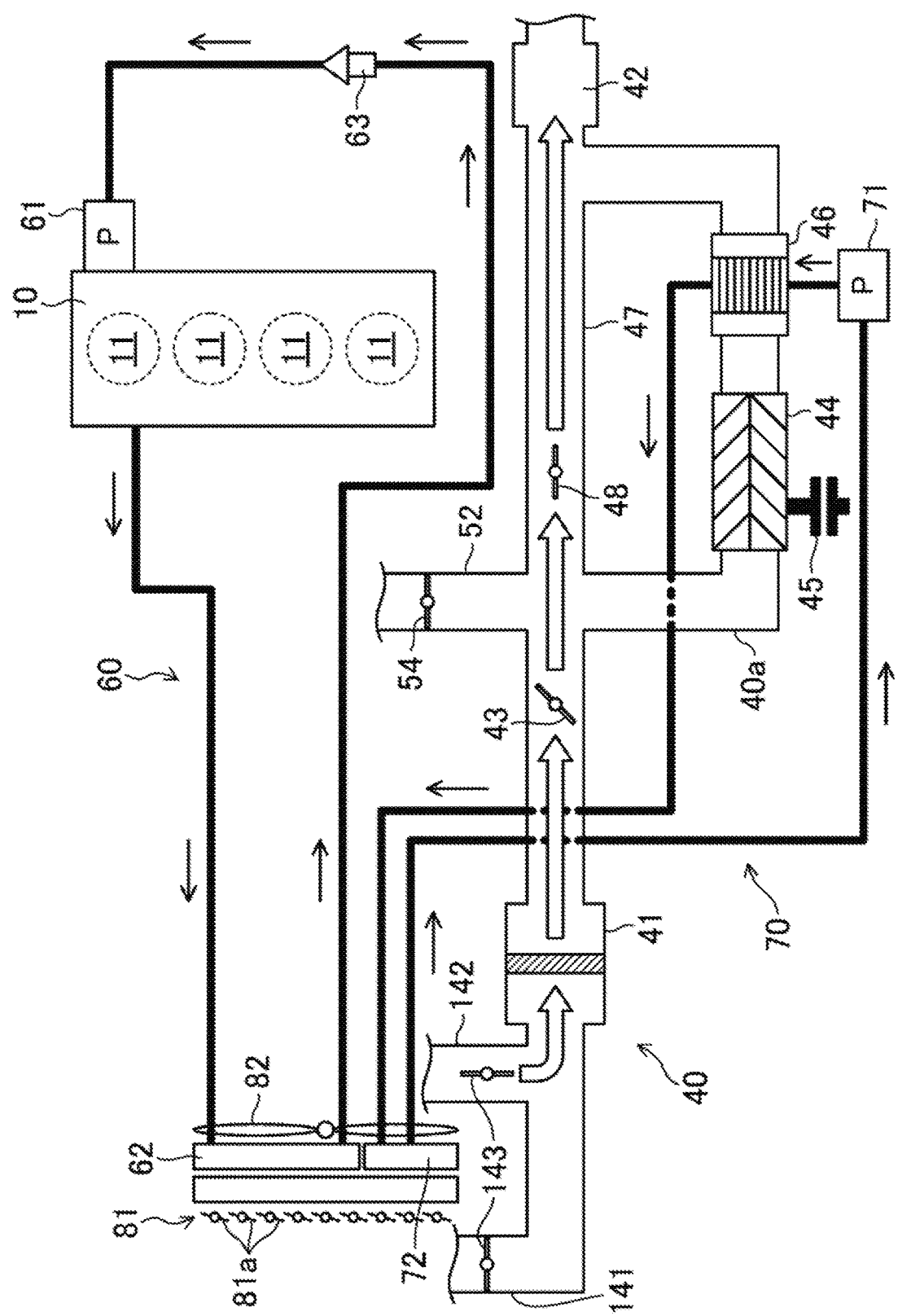
FIG. 6 is a view illustrating a flow of intake air, a flow of engine coolant, and a flow of intercooler coolant in a range A of FIG. 5.

In detail, when the operating state of the engine body 10 is in the range A, as illustrated in FIG. 6, the ECU 100 outputs the control signal to the intake air adjusting valve 143 so that the first air intake part 141 becomes fully closed and the second air intake part 142 becomes fully opened. Moreover, the ECU 100 outputs control signals to the electromagnetic clutch 45 and the air bypass valve 48 to disconnect the electromagnetic clutch 45 and fully open the air bypass valve 48 so that the supercharger 44 is not driven and the bypass passage 47 is opened. Moreover, the ECU 100 turns off the power to the flow rate control valve 63 so that hot engine coolant flows into the first radiator 62. Moreover, the ECU 100 adjusts the opening of the grille shutter 81 and the rotational speed of the radiator fan 82 so that intake air at the first intake air temperature Ta1 or higher is taken in through the second air intake part 142. Moreover, the ECU 100 fully closes the EGR valve 54.

When the power to the flow rate control valve 63 is turned off, the flow rate control valve 63 will not be opened until the engine coolant becomes above the fluid temperature setting. Thus, in the state where the engine coolant is below the fluid temperature setting, the engine coolant is heated by the heat of the engine body 10 without circulating. When the engine coolant becomes above the fluid temperature setting, the flow rate control valve 63 begins to open and the engine coolant begins to circulate through the first cooling path 60. Therefore, the hot engine coolant above the fluid temperature setting flows into the first radiator 62. The engine coolant which flows into the first radiator 62 is the engine coolant after passing through the flow rate control valve 63 and being heated by the engine body 10. Thus, the temperature of the engine coolant which flows into the first radiator 62 (corresponding to the temperature detected by the fluid temperature sensor SW6) is higher than the preset temperature. Therefore, the flow rate control valve 63 constitutes a part of the fluid temperature adjuster. Note that when the operating state of the engine body 10 is in the range A, the opening of the flow rate control valve 63 varies within a range where the temperature of the engine coolant at the location of the flow rate control valve 63 falls within "range A" of the graph in FIG. 3.

The ECU 100 controls operations of the grille shutter 81 and the radiator fan 82 so that the detection result of the fluid temperature sensor SW6 becomes a first fluid temperature Tw1. When the detection result of the fluid temperature sensor SW6 is below the first fluid temperature Tw1, the ECU 100 fully closes the opening of the grille shutter 81 and sets the rotational speed of the radiator fan 82 to 0 (i.e., the radiator fan 82 is not driven). Therefore, when the engine coolant is below the first fluid temperature Tw1, the engine coolant is not cooled much and the fluid temperature increases. When the detection result of the fluid temperature sensor SW6 becomes above the first fluid temperature Tw1, the ECU 100 opens the grille shutter 81 and increases the rotational speed of the radiator fan 82. In the state where the hot engine coolant flows into the first radiator 62, when the grille shutter 81 is opened and the radiator fan 82 is driven, hot outside air which has exchanged heat with the hot engine coolant flowing through the first radiator 62 flows rearward of the radiator fan 82. Therefore, the hot outside air, i.e., intake air (fresh air) at or above the first intake air temperature Ta1 is taken into the intake passage 40 through the second air intake part 142. Note that the first fluid temperature Tw1 is a temperature higher than the fluid temperature setting (for example, about 105° C.).

The ECU 100 adjusts the opening of the grille shutter 81 within a small opening range, in order to keep the temperature of the engine coolant at or above the first fluid temperature Tw1 as much as possible. In detail, the ECU 100 adjusts the opening of the grille shutter 81 so that the angle at the acute angle side of the flappers 81a with respect to the vertical direction falls within a range below 30°. Moreover, the ECU 100 makes the rotational speed of the radiator fan 82 the lowest possible, in order to keep the temperature of the engine coolant at or above the first fluid temperature Tw1 as much as possible. The flow rate of air passing through the first radiator 62 is reduced by adjusting the opening of the grille shutter 81 at the small opening range, and making the rotational speed of the radiator fan 82 low. Therefore, the air passing through the first radiator 62 is uniformly heated by heat exchange with the engine coolant circulating the first radiator 62. As a result, the temperature of air taken in through the second air intake part 142 to the intake passage 40 can be made as high as possible.

As illustrated in FIG. 6, the hot intake air taken in through the second air intake part 142 passes through the bypass passage 47 and flows into the surge tank 42. Then, the hot intake air is introduced into the combustion chamber 17 of the engine body 10.

Figure 7:
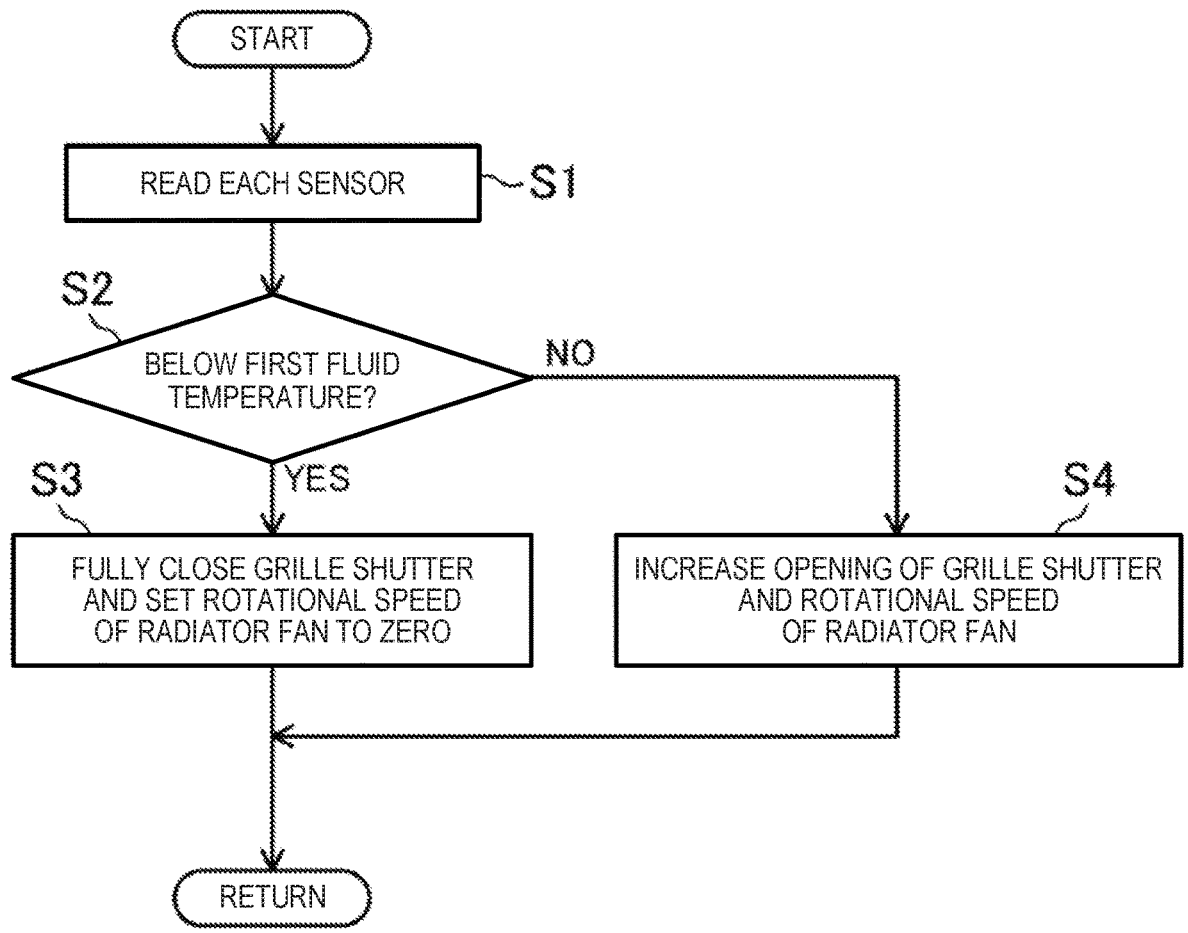
FIG. 7 is a flowchart illustrating a processing operation of an ECU in the range A of FIG. 5.
Figure 8:
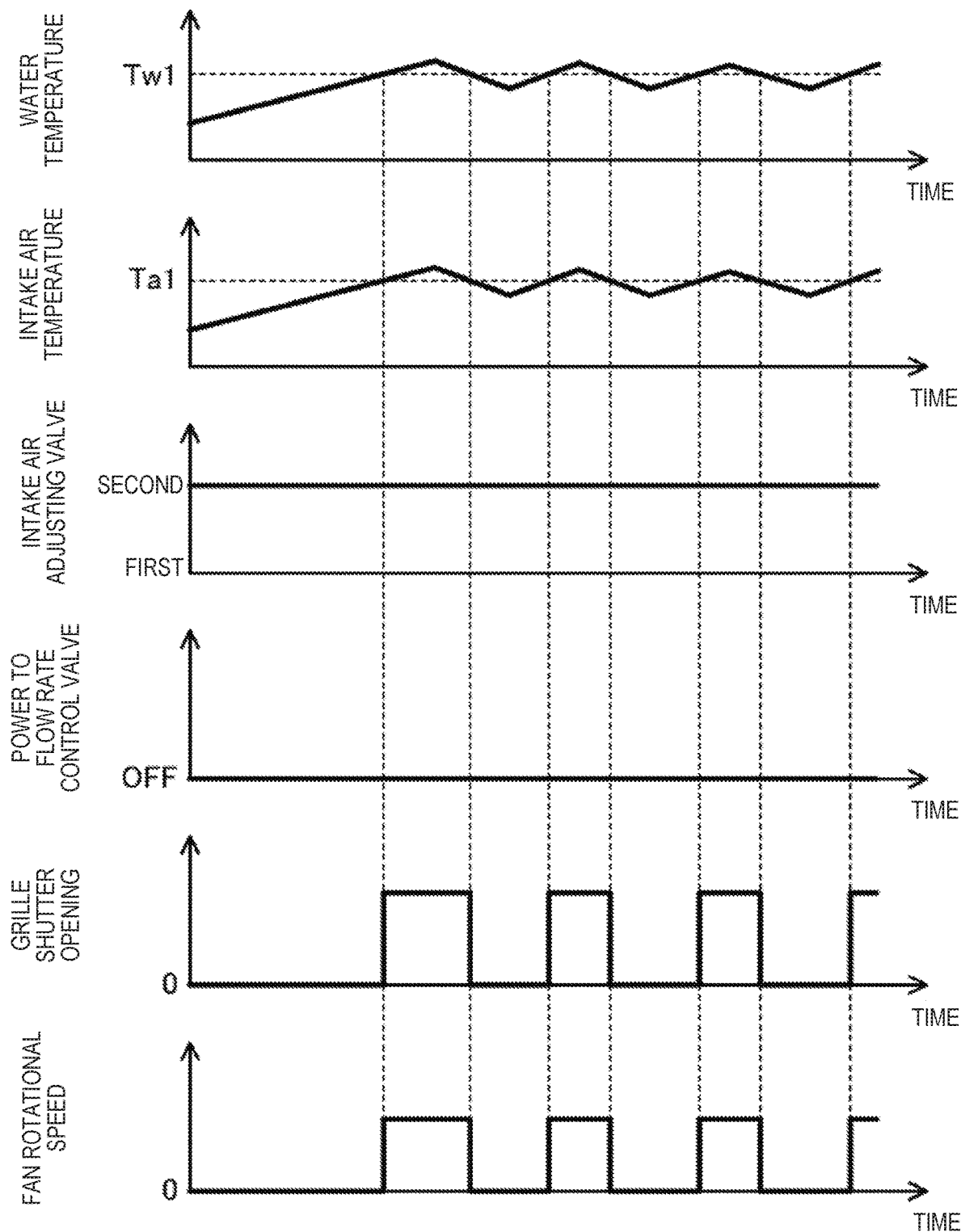
FIG. 8 is a time chart illustrating one example of a driving state of each device in the range A of FIG. 5.

FIG. 7 is a flowchart illustrating a processing operation of the ECU 100 when the operating state of the engine body 10 is in the range A. FIG. 8 is a time chart illustrating one example of driving states of various devices when the operating state of the engine body 10 is in the range A. In the flowchart illustrated in FIG. 7, the intake air adjusting valve 143 is adjusted so that the second air intake part 142 is fully opened (refer to FIG. 8), and the power supplied to the flow rate control valve 63 is turned off (refer to FIG. 8).

First, at Step S1, the ECU 100 reads information from the sensors SW1-SW8.

At the next Step S2, the ECU 100 determines whether the temperature of the engine coolant detected by the fluid temperature sensor SW6 is below the first fluid temperature. If YES (if the temperature of the engine coolant is below the first fluid temperature Tw1) the ECU 100 shifts to Step S3, and on the other hand, if NO (if the temperature of the engine coolant is above the first fluid temperature Tw1, it shifts to Step S4.

At Step S3, the ECU 100 fully closes the grille shutter 81 and sets the rotational speed of the radiator fan 82 to 0. Thus, the engine coolant circulating the first radiator 62 is no longer cooled, and, as illustrated in FIG. 8, the temperature of the engine coolant increases.

At Step S4, the ECU 100 increases the opening of the grille shutter 81 and increases the rotational speed of the radiator fan 82. Thus, the engine coolant circulating the first radiator 62 is cooled, and, as illustrated in FIG. 8, the temperature of the engine coolant decreases. Note that the ECU 100 may increase the opening of the grille shutter 81 as the engine load increases, or may increase the rotational speed of the radiator fan 82 as the engine load increases.

As described above, when the operating state of the engine body 10 is in the range A, the ECU 100 outputs control signals to the grille shutter 81 and the radiator fan 82 so that the temperature detected by the fluid temperature sensor SW6 becomes the first fluid temperature Tw1. Therefore, the intake air at or above the first intake air temperature Ta1 is stably introduced into the engine body 10.

When the engine body 10 operates in the range A by operating and controlling each device as described above, the hot intake air (at or above the first intake air temperature Ta1) is introduced into the engine body 10. Therefore, SPCCI combustion can be stably performed when the engine body 10 operates in the range A.

Moreover, while the engine body 10 operates in the range A, the ECU 100 outputs the control signal to the second pump 71 so that the intercooler coolant is supplied to the intercooler 46. This is for the cooling of the intake air by the intercooler 46 being carried out with a sufficient response, when the operating state of the engine body 10 becomes in a range (for example, the range C) where the supercharger 44 is driven, from the range A. The ECU 100 outputs the control signal to the second pump 71 so that the flow rate of the intercooler coolant supplied per unit time to the intercooler 46 becomes a first flow rate.

(Low-Load High-Speed Range B)

While the engine body 10 operates in the range B, the engine 1 performs SPCCI combustion in the state where A/F or G/F of the mixture gas inside the cylinder 11 (combustion chamber 17) becomes near the stoichiometric air-fuel ratio. In detail, fuel is injected from the injector 6 so that A/F or G/F becomes 14.5:1 to 15.0:1, and the ignition plug 25 is operated at a desired timing. That is, the range B corresponds to a rich operating range where A/F or G/F is relatively high. In the range B, since the engine speed is high, it is necessary to increase a compression end temperature to facilitate a generation of the compression ignition, in order to stably perform SPCCI combustion (especially, CI combustion). Thus, also while the engine body 10 operates in the range B, the ECU 100 controls and operates each device so that intake air at or above the first intake air temperature Ta1 is introduced into the engine body 10.

Figure 9:
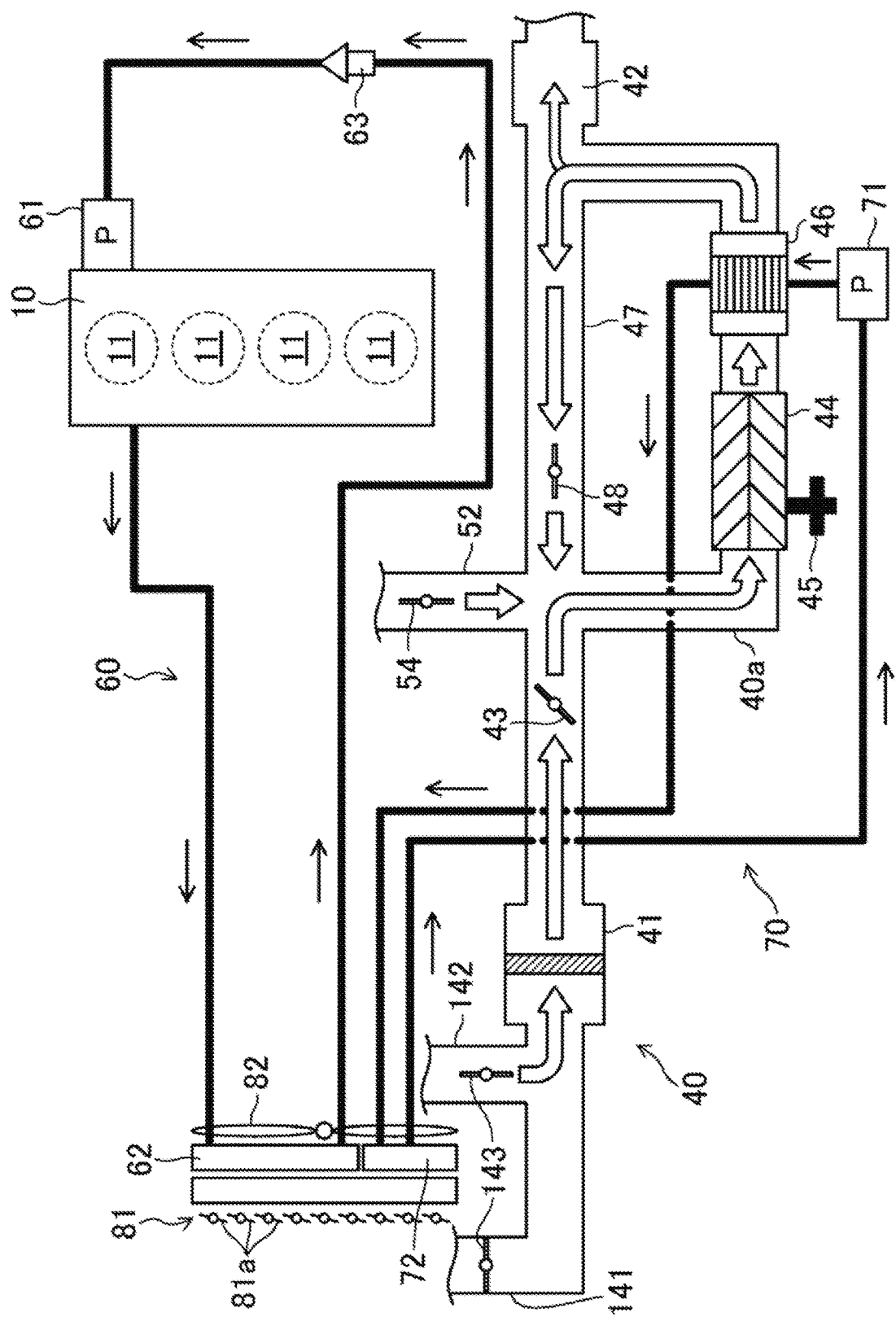
FIG. 9 is a view illustrating a flow of intake air, a flow of engine coolant, and a flow of intercooler coolant in a range B of FIG. 5.

In detail, when the operating state of the engine body 10 is in the range B, as illustrated in FIG. 9, the ECU 100 outputs the control signal to the intake air adjusting valve 143 so that the first air intake part 141 is fully closed and the second air intake part 142 is fully opened. Moreover, the ECU 100 outputs control signals to the electromagnetic clutch 45 and the air bypass valve 48 to connect the electromagnetic clutch 45 and fully open the air bypass valve 48 so that the supercharger 44 is driven and the bypass passage 47 is opened. Moreover, the ECU 100 turns on the power to the flow rate control valve 63. Moreover, the ECU 100 adjusts the opening of the grille shutter 81 and the rotational speed of the radiator fan 82 so that intake air at or above the first intake air temperature Ta1 is taken in through the second air intake part 142. Moreover, the ECU 100 opens the EGR valve 54 to introduce the EGR gas.

When turning on the power to the flow rate control valve 63, the flow rate control valve 63 opens, even if the engine coolant is below the fluid temperature setting. Thus, even if the engine coolant is below the fluid temperature setting, the engine coolant circulates through the first cooling path 60. Therefore, the engine coolant below the first fluid temperature Tw1 flows into the first radiator 62. Note that when the operating state of the engine body 10 is in the range B, the opening of the flow rate control valve 63 varies within a range where the temperature of the engine coolant at the location of the flow rate control valve 63 falls within "range B" of the graph in FIG. 3.

While the operating state of the engine body 10 is in the range B, the ECU 100 opens the grille shutter 81 and drives the radiator fan 82, even if the detection result of the fluid temperature sensor SW6 is below the first fluid temperature Tw1. In more detail, the ECU 100 adjusts the opening of the grille shutter 81 and the rotational speed of the radiator fan 82 so that the detection result of the fluid temperature sensor SW6 becomes below the first fluid temperature Tw1 and above a second fluid temperature Tw2. At this time, the ECU 100 increases the opening of the grille shutter 81 and increases the rotational speed of the radiator fan 82 (refer to FIG. 11), as compared with the opening when the operating state of the engine body 10 is in the range A. After the outside air exchanges heat with the engine coolant flowing through the first radiator 62 flows rearward of the radiator fan 82, it is then taken into the intake passage 40 through the second air intake part 142. Note that when the operating state of the engine body 10 is in the range B, the ECU 100 adjusts the opening of the grille shutter 81 within a middle opening range. In detail, ECU 100 adjusts the angle at the acute angle side of the flappers 81a with respect to the vertical direction within a range of 30° or more and below 60°. Moreover, the second fluid temperature Tw2 is a temperature lower than the first fluid temperature Tw1 (for example, about 90° C.).

While the operating state of the engine body 10 is in the range B, the temperature of the engine coolant which flows into the first radiator 62 is low, the opening of the grille shutter 81 is large, and the rotational speed of the radiator fan 82 is high, as compared with the case where the operating state of the engine body 10 is in the range A. Thus, when the operating state of the engine body 10 is in the range B, the temperature of air taken into the intake passage 40 through the second air intake part 142 becomes low, as compared with the case where the operating state of the engine body 10 is in the range A.

As described above, when the bypass passage 47 is opened and the supercharger 44 is driven, a portion of the intake air which passed through the supercharger 44 flows back to the upstream side of the supercharger 44 through the bypass passage 47, as illustrated in FIG. 9. Thus, after the portion of the intake air taken into the intake passage 40 through the second air intake part 142 is temporarily compressed by the supercharger 44, it then flows back to the upstream side of the supercharger 44 through the bypass passage 47. The intake air which flowed back to the upstream side of the supercharger 44 through the bypass passage 47 again passes through the supercharger 44. Thus, the intake air inside the intake passage 40 circulates (recirculates) inside the intake passage 40 through the supercharger 44 and the bypass passage 47. Therefore, even if the supercharger 44 is driven, the intake air can be introduced into the combustion chamber 17 in the non-boosted state.

Since the intake air during the recirculation is compressed by the supercharger 44, its temperature increases. Moreover, when the operating state of the engine body 10 is in the range B, since the EGR valve 54 is opened, the EGR gas is taken into the recirculating intake air. Since the EGR gas is higher in the temperature than the intake air taken into the intake passage 40 through the second air intake part 142, the temperature of the intake air into which the EGR gas is taken in increases.

In order to prevent the recirculating intake air (fresh air+EGR gas) from becoming excessively high in temperature, the ECU 100 outputs the control signal to the second pump 71 so that the intercooler coolant may be supplied to the intercooler 46. Therefore, the recirculating intake air is cooled by the intercooler 46. At this time, the ECU 100 outputs the control signal to the second pump 71 so that a flow rate of the intercooler coolant supplied per unit time to the intercooler 46 becomes a second flow rate. The second flow rate is more than the first flow rate, and is such a flow rate that the temperature of the recirculating intake air does not become below the first intake air temperature Ta1.

As described above, while the engine body 10 operates in the range B, the intake air is heated by the recirculating of intake air and the introduction of EGR gas. Thus, as compared with the case where the operating state of the engine body 10 is in the range A, the intake air at or above the first intake air temperature Ta1 can be introduced into the combustion chamber 17 of the engine body 10, even if the temperature of air taken in to the intake passage 40 from the second air intake part 142 is low. Therefore, SPCCI combustion can be stably performed, while the engine body 10 operates in the range B.

(High-Load Range C)

While the engine body 10 operates in the range C, as for the engine 1, A/F or G/F of the mixture gas inside the combustion chamber 17 performs SPCCI combustion in the state near a stoichiometric air-fuel ratio. In detail, fuel is injected from the injector 6 so that A/F or G/F becomes 14.5:1 to 15.0:1, and the ignition plug 25 is operated at a desired timing. That is, the range C corresponds to a rich operating range where A/F or G/F is relatively high. In the high engine load state, since there is a large amount of fuel injected, as much intake air (fresh air) as possible is needed in order to acquire a suitable combustion torque. Moreover, in the high engine load state, since there is a large amount of fuel injected, if the temperature of the engine body 10 is too high, the mixture gas self-ignites while being compressed, thereby causing a premature ignition of the fuel at the unintended timing. Thus, when the operating state of the engine body 10 is in the range C, intake air (especially, fresh air) at low temperature and with a high air density needs to be introduced into the engine body 10 in order to stably perform SPCCI combustion. Moreover, it is necessary to cool the engine body 10 appropriately. Thus, the ECU 100 controls and operates each device so that intake air at or below a second intake air temperature Ta2 is introduced into the engine body 10, and the engine body 10 is cooled appropriately. Note that the second intake air temperature Ta2 is a temperature below the first intake air temperature Ta1 (for example, about 60° C.).

Figure 10:
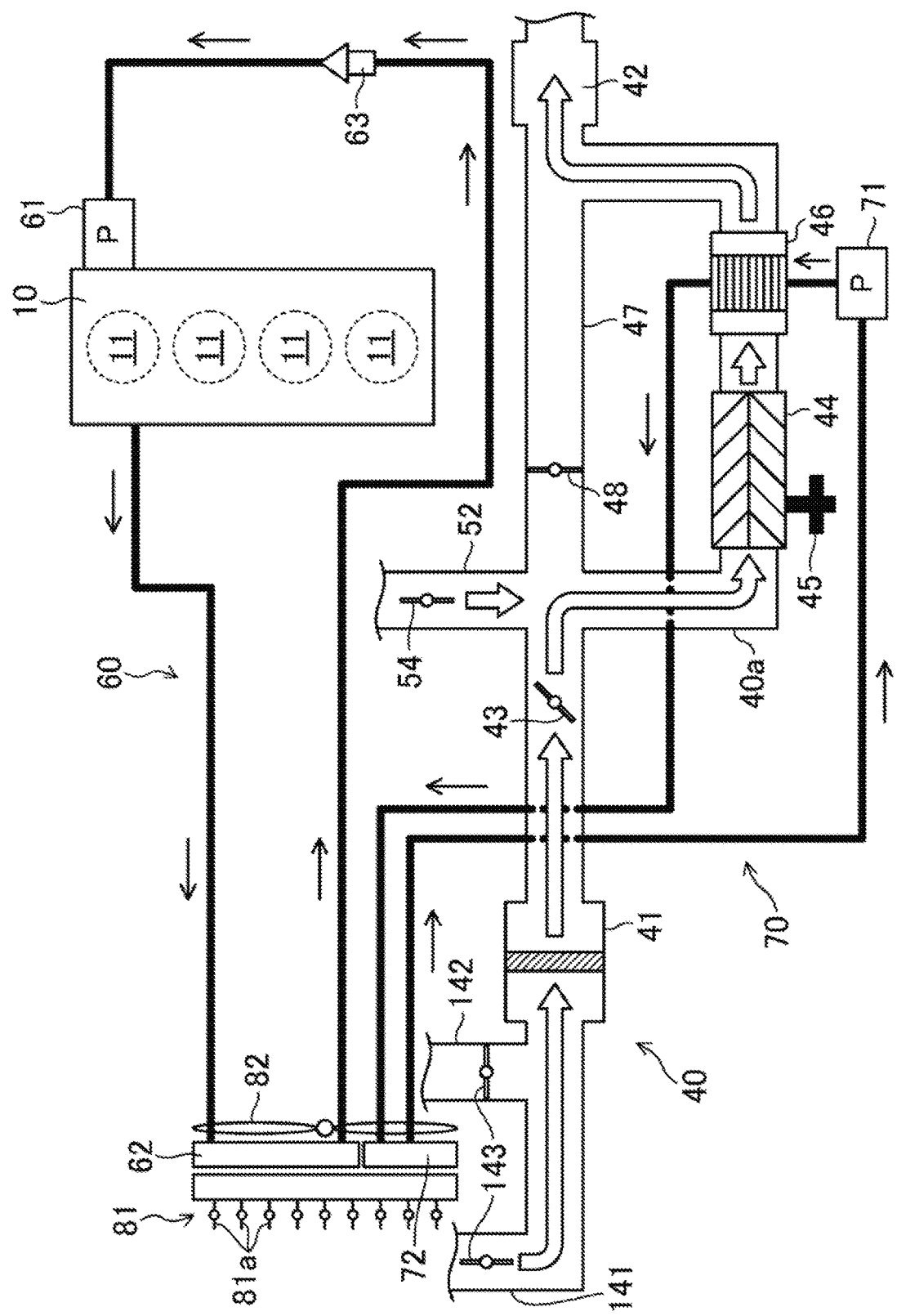
FIG. 10 is a view illustrating a flow of intake air, a flow of engine coolant, and a flow of intercooler coolant in a range C of FIG. 5.

In detail, when the operating state of the engine body 10 is in the range C, as illustrated in FIG. 10, the ECU 100 outputs the control signal to the intake air adjusting valve 143 so that the first air intake part 141 is fully opened and the second air intake part 142 is fully closed. Moreover, the ECU 100 outputs the control signals to the electromagnetic clutch 45 and the air bypass valve 48 to connect the electromagnetic clutch 45 and fully close the air bypass valve 48 so that the supercharger 44 is driven and the bypass passage 47 is closed. Moreover, the ECU 100 turns on the power to the flow rate control valve 63. Moreover, the ECU 100 adjusts the opening of the grille shutter 81 and the rotational speed of the radiator fan 82 so that the engine coolant and the intercooler coolant are cooled. Moreover, the ECU 100 opens the EGR valve 54 to introduce the EGR gas.

As described above, by turning on the power to the flow rate control valve 63, the flow rate control valve 63 opens, even if the engine coolant is below the fluid temperature setting. Thus, even if the engine coolant is below a given fluid temperature, the engine coolant circulates through the first cooling path 60. Therefore, the engine coolant below the fluid temperature setting flows into the first radiator 62. Note that when the operating state of the engine body 10 is in the range C, the opening of the flow rate control valve 63 varies within a range where the temperature of the engine coolant at the location of the flow rate control valve 63 falls within "range C" of the graph in FIG. 3.

When the operating state of the engine body 10 is in the range C, the ECU 100 opens the grille shutter 81 and drives the radiator fan 82. At this time, the ECU 100 adjusts the opening of the grille shutter 81 and the rotational speed of the radiator fan 82 so that the detection result of the fluid temperature sensor SW6 becomes the second fluid temperature Tw2. In detail, the ECU 100 adjusts the opening of the grille shutter 81 within a high opening range, i.e., a range where the angle at the acute angle side of the flappers 81a with respect to the vertical direction (including a right angle) becomes 60° or more and 90° or less. Moreover, the ECU 100 makes the rotational speed of the radiator fan 82 higher than the rotational speed when the operating state of the engine body 10 is in the ranges A and B. Accordingly, as compared with the cases where the operating state of the engine body 10 is in the ranges A and B (i.e., when the engine load is low), the amount of the outside air which flows to the first and second radiators 62 and 72 increases. Therefore, the coolant which flows through the first and second radiators 62 and 72 can be actively cooled, and the engine body 10 can be cooled appropriately.

On the other hand, in the intake system, intake air (fresh air) is taken into the intake passage 40 through the first air intake part 141. When the operating state of the engine body 10 is in the range C, since the EGR valve 54 is opened, EGR gas is taken into the intake air which is taken into the intake passage 40 through the first air intake part 141. Moreover, since the air bypass valve 48 is fully closed, the intake air (fresh air+EGR gas) flows toward the supercharging side passage 40a. Since the electromagnetic clutch 45 is connected and the supercharger 44 is driven, the intake air which flowed toward the supercharging side passage 40a is boosted by the supercharger 44. Therefore, the temperature of the intake air increases.

The ECU 100 outputs the control signal to the second pump 71 so that the intercooler coolant is supplied to the intercooler 46, in order to make the temperature of the intake air boosted by the supercharger 44 at or below the second intake air temperature Ta2. At this time, the ECU 100 outputs the control signal to the second pump 71 so that the flow rate of the intercooler coolant supplied per unit time to the intercooler 46 becomes a third flow rate. The third flow rate is more than the second flow rate. Thus, the temperature of the intake air can be made at or below the second intake air temperature Ta2 by increasing the flow rate of the intercooler coolant supplied to the intercooler 46. Moreover, as described above, when the operating state of the engine body 10 is in the range C, the amount of the outside air which flows to the second radiator 72 increases, as compared with the cases when the operating state of the engine body 10 is in the ranges A and B. Thus, the temperature of the intercooler coolant is low as compared with the cases when the operating state of the engine body 10 is in the ranges A and B. Therefore, the temperature of intake air can be made at or below the second intake air temperature Ta2 more efficiently.

The intake air which is boosted by the supercharger 44 and cooled at or below the second intake air temperature Ta2 by the intercooler 46 is supplied to the combustion chamber 17 of the engine body 10 through the surge tank 42.

By operating and controlling each device as described above, while the engine body 10 operates in the range C, the cold intake air (at or below the second intake air temperature Ta2) is introduced into the engine body 10, and the engine body 10 is cooled appropriately. Therefore, while the engine body 10 operates in the range C, SPCCI combustion can be stably performed.

(Operation of Each Device in Accordance with Change in Operating State of Engine Body)

Figure 11:
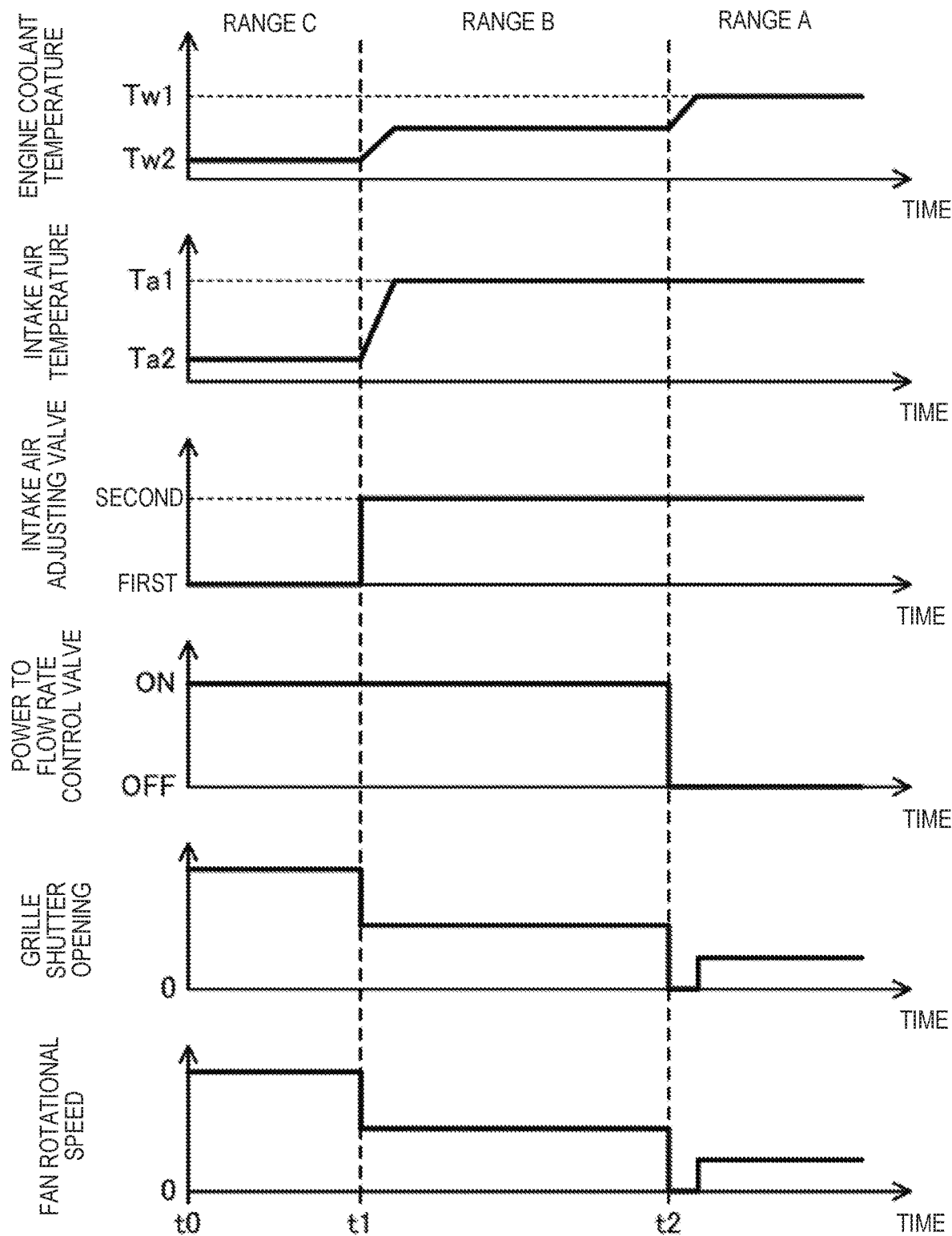
FIG. 11 is a time chart illustrating one example of a driving state of each device according to the flow of intake air, the flow of engine coolant, and the flow of intercooler coolant.

FIG. 11 is a time chart illustrating a change in the operating state of each device in accordance with a change in the operating state of the engine body 10. Note that in the time chart of FIG. 11, the scale of the vertical axis may differ from the time chart of FIG. 8, such as the scale for the opening of the grille shutter 81. Moreover, in the time chart of FIG. 11, the intake air temperature is the detection result of the intake air temperature sensor SW2, and may differ from the temperature of air which is taken into the intake passage 40 from the first and second air intake parts 141 and 142.

First, suppose that the operating state of the engine body 10 is in the range C at a time t0. At this time, as described above, the ECU 100 controls and operates each device so that the temperature of the engine coolant becomes the second fluid temperature Tw2 and the intake air temperature becomes the second intake air temperature Ta2.

Next, at a time t1, suppose that the operating state of the engine body 10 is moved from the range C to the range B. At this time, the ECU 100 controls and operates each device so that the intake air temperature becomes the first intake air temperature Ta1, while the temperature of the engine coolant is below the first fluid temperature Tw1 and above the second fluid temperature Tw2. In detail, the ECU 100 reduces the opening of the grille shutter 81 and decreases the rotational speed of the radiator fan 82. Accordingly, the temperature of the engine coolant is made below the first fluid temperature Tw1 and above the second fluid temperature Tw2.

The ECU 100 operates the intake air adjusting valve 143 so that air can be taken in through the second air intake part 142. At this time, the temperature of the air taken in through the second air intake part 142 is above the second intake air temperature Ta2 but below the first intake air temperature Ta1. Although illustration is omitted in FIG. 11, the ECU 100 connects the electromagnetic clutch 45 to drive the supercharger 44, and fully opens the air bypass valve 48 to recirculate a portion of the intake air inside the intake passage 40. Further, the ECU 100 outputs the control signal to the second pump 71 so that the flow rate of the intercooler coolant supplied per unit time to the intercooler 46 decreases (from the third flow rate to the second flow rate). Accordingly, the ECU 100 sets the temperature of the intake air at the stage where it is introduced into the engine body 10 to the first intake air temperature Ta1.

Then, suppose that the engine speed decreases and, at a time t2, the operating state of the engine body 10 shifts from the range B to the range A. At this time, the ECU 100 operates and controls each device so that the temperature of the engine coolant becomes the first fluid temperature Tw1 and the intake air temperature becomes the first intake air temperature Ta1. In detail, the ECU 100 suspends the power to the flow rate control valve 63. Therefore, the flow rate control valve 63 will not open until the temperature of the engine coolant becomes the preset temperature or higher. Moreover, the ECU 100 reduces the opening of the grille shutter 81 and reduces the rotational speed of the radiator fan 82. In detail, as illustrated in FIG. 7, the ECU 100 fully closes the grille shutter 81 and sets the rotational speed of the radiator fan 82 to 0 until the detection result of the fluid temperature sensor SW6 becomes the first fluid temperature Tw1 or higher. Thus, the temperature of the engine coolant becomes the first fluid temperature Tw1.

Then, when the detection result of the fluid temperature sensor SW6 becomes the first fluid temperature Tw1 or higher, the ECU 100 opens the grille shutter 81 and increases the rotational speed of the radiator fan 82. As illustrated in FIG. 11, the opening of the grille shutter 81 and the rotational speed of the radiator fan 82 at this time are less than that of when the operating state of the engine body 10 is in the range B. Therefore, when the operating state of the engine body 10 is in the range A, the flow rate of air passing through the first radiator 62 decreases, as compared with the cases when the operating state of the engine body 10 is in the ranges B and C. Thus, because the flow rate of air passing through the first radiator 62 decreases, the air passing through the first radiator 62 is uniformly heated by heat exchange with the coolant circulating the first radiator 62. As a result, the temperature of air which is taken into the intake passage 40 through the second air intake part 142 can be made to the first intake air temperature Ta1 when being taken into the intake passage 40 through the second air intake part 142. Note that although illustration is omitted in FIG. 11, as described above, the ECU 100 disconnects the electromagnetic clutch 45 and does not drive the supercharger 44, and fully opens the air bypass valve 48 to introduce the intake air into the engine body 10 through the bypass passage 47.

(Conclusions)

As described above, in this embodiment, when the engine body 10 is in the operating range where CI combustion is performed (ranges A-C), and the operating state of the engine body 10 is in the lean operating range (range A), the ECU 100 outputs the control signal to each device (the flow rate control valve 63, the grille shutter 81, the radiator fan 82, and the intake air adjusting valve 143) so that the temperature of air taken in through the air intake parts (the first and second air intake parts 141 and 142) to the intake passage 40 becomes high, as compared with the case when the operating state of the engine body 10 is in the rich operating range (ranges B and C). Therefore, when the operating state of the engine body is in the range A, the air at the temperature as high as possible can be taken into the intake passage 40. Thus, since the intake air at the temperature as high as possible is introduced into the engine body 10 when the operating state of the engine body 10 is in the range A, the temperature of the mixture gas when a compression starts can be increased. As a result, combustion stability in the lean operating range (range A) can be improved.

Moreover, in this embodiment, the air intake part includes the first air intake part 141 which is located forward of the first radiator 62, and the second air intake part 142 which is located rearward of the first radiator 62 and takes in air after passing through the first radiator 62 and exchanging heat with the engine coolant to the intake passage 40. The air intake part also includes the intake air adjusting valve 143 which adjusts the ratio of the amount of air taken in through the first air intake part 141 to the intake passage 40 to the amount of air taken in through the second air intake part 142 to the intake passage 40. When the operating state of the engine body is in the range A, the ECU 100 outputs the control signal to the intake air adjusting valve 143 so that the ratio of the amount of air taken in through the second air intake part 142 to the intake passage 40 increases, as compared with the case when the operating state of the engine body 10 is in the range C. In particular, in this embodiment, when the operating state of the engine body is in the range A, air is fundamentally taken into the intake passage 40 only through the second air intake part 142. That is, the second air intake part 142 takes into the intake passage 40 the air heated by heat exchange with the engine coolant circulating the first radiator 62. Thus, when the operating state of the engine body 10 is in the range A, the air at the temperature higher enough than the ambient temperature can be taken into the intake passage 40. As a result, in the lean operating range of the operating range where CI combustion is performed, the temperature of the mixture gas when a compression starts can be more effectively increased, thereby further improving combustion stability in the lean operating range.

Moreover, in this embodiment, when the operating state of the engine body 10 is in the range A, the ECU 100 outputs the control signal to each device (the flow rate control valve 63, the grille shutter 81, and the radiator fan 82) so that the temperature of the engine coolant circulating the first radiator 62 is increased, as compared with the cases when the operating state of the engine body 10 is in the ranges B and C. Therefore, the temperature of air taken into the intake passage 40 through the second air intake part 142 can be more efficiently increased. Therefore, when the operating state of the engine body is in the range A, the air at the temperature higher enough than the ambient temperature can be more efficiently taken into the intake passage 40. As a result, in the lean operating range within the operating range where CI combustion is performed, the temperature of the mixture gas when a compression starts can be increased further effectively, thereby further improving combustion stability in the lean operating range.

Moreover, in this embodiment, when the operating state of the engine body 10 is in the range A, the ECU 100 outputs the control signals to the grille shutter 81 and the radiator fan 82 so that at least one of the opening of the grille shutter 81 and the rotational speed of the radiator fan 82 is reduced, as compared with the cases when the operating state of the engine body 10 is in the ranges B and C. That is, when the opening of the grille shutter 81 is reduced and the rotational speed of the radiator fan 82 is reduced, the flow rate of air passing through the first radiator 62 decreases. When the flow rate of air passing through the first radiator 62 decreases, air passing through the first radiator 62 is uniformly heated by heat exchange with the engine coolant circulating the first radiator 62. Therefore, the temperature of air taken into the intake passage 40 through the second air intake part 142 can be increased further efficiently. Therefore, in the lean operating range within the operating range where CI combustion is performed, the temperature of the mixture gas when a compression starts can be increased further effectively, thereby further improving combustion stability in the lean operating range.

The technology disclosed herein is not limited to the above embodiment, and it can be substituted without departing from the scope of the present disclosure.

For example, in the above embodiment, when the operating state of the engine body 10 is in the range A, the ECU 100 outputs the control signals to the grille shutter 81 and the radiator fan 82 so that the detection temperature detected by the fluid temperature sensor SW6 becomes the first fluid temperature Tw1. Without limiting to this configuration, the control signal may be outputted to only one of the grille shutter 81 and the radiator fan 82. Moreover, for example, only the rotational speed of the radiator fan 82 is adjusted first, and a control to adjust the opening of the grille shutter 81 may be performed when the detection result of the fluid temperature sensor SW6 does not become the first fluid temperature Tw1, even if a certain period passes after the adjustment.

Moreover, in the above embodiment, when the operating state of the engine body 10 is in the range A, the ECU 100 outputs the control signals to the grille shutter 81 and the radiator fan 82 so that the detection temperature detected by the fluid temperature sensor SW6 becomes the first fluid temperature Tw1. Alternatively, or additionally, the ECU 100 may output the control signal to at least one of the grille shutter 81 and the radiator fan 82 so that the detection temperature detected by the intake temperature sensor SW2 becomes the first intake air temperature Ta1.

Moreover, in the above embodiment, when the operating state of the engine body 10 is in the range B (rich operating range), the ECU 100 lowers the fluid temperature of the engine coolant, as compared with the case where the operating state of the engine body 10 is in the range A (lean operating range), so as to lower the temperature of air taken into the intake passage 40. Without limiting to this configuration, when the operating state of the engine body 10 is in the range B, the ECU 100 may output the control signal to the intake air adjusting valve 143 so that both the first air intake part 141 and the second air intake part 142 open, to lower the temperature of air taken into the intake passage 40. That is, the temperature of air taken into the intake passage 40 through the first air intake part 141 is lower than the temperature of air taken into the intake passage 40 through the second air intake part 142. Thus, when both the first air intake part 141 and the second air intake part 142 open, the temperature of air can be lowered more than the case where air is taken in only through the second air intake part 142 to the intake passage 40. Note that in this case, the ECU 100 adjusts the openings of the first air intake part 141 and the second air intake part 142 so that the ratio of the amount of fresh air taken in through the first air intake part 141 to the amount of fresh air taken in through the second air intake part 142 becomes a suitable ratio.

The above embodiment is merely an illustration and the scope of the present disclosure is not to be interpreted in a limited sense. The scope of the present disclosure is defined by the appended claims, and all the modifications and changes which belong to the range of equivalents to the claims fall within the range of the present disclosure. Further, if used herein, a phrase of the form "at least one of A and B" means at least one A or at least one B, without being mutually exclusive of each other, and does not require at least one A and at least one B. If used herein, the phrase "and/or" means either or both of two stated possibilities.

The technology disclosed herein is useful as the intake-air temperature controlling device for the engine, which includes the engine body having the cylinder, and the intake passage connected to the engine body. The controlling device has, as the operating range at least after a warm-up of the engine body, the lean operating range in which the air-fuel ratio (A/F) of the mixture gas formed inside the cylinder, or the relationship G/F between the total gas weight G inside the cylinder and the weight F of fuel fed to the cylinder is relatively low, and the rich operating range in which A/F or G/F is relatively high.

DESCRIPTION OF REFERENCE CHARACTERS

1 Engine
10 Engine Body
40 Intake Passage
62 First Radiator
63 Flow Rate Control Valve (Intake Air Temperature Adjuster, Fluid Temperature Adjuster)
81 Grille Shutter (Intake Air Temperature Adjuster, Fluid Temperature Adjuster)
82 Radiator Fan (Intake Air Temperature Adjuster, Fluid Temperature Adjuster)
100 ECU (Controller)
141 First Air Intake Part
142 Second Air Intake Part
143 Intake Air Adjusting Valve (Intake Air Temperature Adjuster)

What is claimed is:
1. An intake-air temperature controlling device for an engine, comprising:
an engine body having a cylinder;
an intake passage connected to the engine body;
an air intake part configured to take air into the intake passage;
an intake air temperature adjuster configured to adjust a temperature of air taken in through the air intake part to the intake passage;
a radiator through which coolant configured to cool the engine body circulates; and
a controller comprised of circuitry and configured to control the intake air temperature adjuster, the controller storing beforehand, as an operating range at least after a warm-up of the engine body, an operating range in which compression ignition (CI) combustion in which a compression self-ignition of a mixture gas comprised of fuel and intake air is performed, wherein the operating range in which the CI combustion is performed has a lean operating range in which an air-fuel ratio (A/F) of the mixture gas formed inside the cylinder, or a gas-fuel ratio (G/F) that is a relationship between the total weight G of gas inside the cylinder and a weight F of fuel fed to the cylinder is relatively low, and a rich operating range in which the A/F or G/F is relatively high, wherein when the controller determines that an operating state of the engine body is in the lean operating range, the controller outputs a control signal to the intake air temperature adjuster so that the temperature of the air taken in through the air intake part to the intake passage is increased, as compared with a case when determining that the operating state of the engine body is in the rich operating range, wherein the air intake part includes a first air intake part located forward of the radiator, and a second air intake part located rearward of the radiator and configured to take air into the intake passage after passing through the radiator and exchanging heat with the coolant, wherein the intake air temperature adjuster includes an intake air adjusting valve configured to adjust a ratio of an amount of air taken in through the first air intake part to the intake passage to an amount of air taken in through the second air intake part to the intake passage, wherein in the operating range where the engine body performs the CI combustion, when the operating state of the engine body is in the lean operating range, the controller outputs a control signal to the intake air adjusting valve so that the ratio of the amount of air taken in through the second air intake part to the intake passage is increased, as compared with the case when the operating state of the engine body is in the rich operating range, wherein the intake air temperature adjuster further includes a grille shutter provided forward of the radiator and configured to adjust a flow rate of air taken into an engine bay, and a fan provided rearward of the radiator and forward of the second air intake part and configured to draw air into the engine bay, and wherein in the operating range where the engine body performs the CI combustion, when the operating state of the engine body is in the lean operating range, the controller outputs a control signal to at least one of the grille shutter and the fan so that at least one of an opening of the grille shutter and a rotational speed of the fan is reduced, as compared with the case when the operating state of the engine body is in the rich operating range.

2. An intake-air temperature controlling device for an engine, comprising:

an engine body having a cylinder;

an intake passage connected to the engine body;

an air intake part configured to take air into the intake passage;

an intake air temperature adjuster configured to adjust a temperature of air taken in through the air intake part to the intake passage;

a radiator through which coolant configured to cool the engine body circulates; and a controller comprised of circuitry and configured to control the intake air temperature adjuster, the controller storing beforehand, as an operating range at least after a warm-up of the engine body, an operating range in which compression ignition (CI) combustion in which a compression self-ignition of a mixture gas comprised of fuel and intake air is performed, wherein the operating range in which the CI combustion is performed has a lean operating range in which an air-fuel ratio (A/F) of the mixture gas formed inside the cylinder, or a gas-fuel ratio (G/F) that is a relationship between the total weight G of gas inside the cylinder and a weight F of fuel fed to the cylinder is relatively low, and a rich operating range in which the A/F or G/F is relatively high, wherein when the controller determines that an operating state of the engine body is in the lean operating range, the controller outputs a control signal to the intake air temperature adjuster so that the temperature of the air taken in through the air intake part to the intake passage is increased, as compared with a case when determining that the operating state of the engine body is in the rich operating range, wherein the air intake part includes a first air intake part located forward of the radiator, and a second air intake part located rearward of the radiator and configured to take air into the intake passage after passing through the radiator and exchanging heat with the coolant, wherein the intake air temperature adjuster includes an intake air adjusting valve configured to adjust a ratio of an amount of air taken in through the first air intake part to the intake passage to an amount of air taken in through the second air intake part to the intake passage, wherein in the operating range where the engine body performs the CI combustion, when the operating state of the engine body is in the lean operating range, the controller outputs a control signal to the intake air adjusting valve so that the ratio of the amount of air taken in through the second air intake part to the intake passage is increased, as compared with the case when the operating state of the engine body is in the rich operating range, wherein the intake air temperature adjuster further includes a fluid temperature adjuster configured to adjust a temperature of the coolant flowing into the radiator, wherein in the operating range where the engine body performs the CI combustion, when the operating state of the engine body is in the lean operating range, the controller outputs a control signal to the fluid temperature adjuster so that the temperature of the coolant circulating the radiator becomes higher, as compared with the case when the operating state of the engine body is in the rich operating range, wherein the intake air temperature adjuster further includes a grille shutter provided forward of the radiator and configured to adjust a flow rate of air taken into an engine bay, and a fan provided rearward of the radiator and forward of the second air intake part and configured to draw air into the engine bay, and wherein in the operating range where the engine body performs the CI combustion, when the operating state of the engine body is in the lean operating range, the controller outputs a control signal to at least one of the grille shutter and the fan so that at least one of an opening of the grille shutter and a rotational speed of the fan is reduced, as compared with the case when the operating state of the engine body is in the rich operating range.

3. An intake-air temperature controlling device for an engine, comprising:

an engine body having a cylinder;

an intake passage connected to the engine body;

an air intake part configured to take air into the intake passage;

an intake air temperature adjuster configured to adjust a temperature of air taken in through the air intake part to the intake passage;

a radiator through which coolant configured to cool the engine body circulates; and a controller comprised of circuitry and configured to control the intake air temperature adjuster, the controller storing beforehand, as an operating range at least after a warm-up of the engine body, an operating range in which compression ignition (CI) combustion in which a compression self-ignition of a mixture gas comprised of fuel and intake air is performed, wherein the operating range in which the CI combustion is performed has a lean operating range in which an air-fuel ratio (A/F) of the mixture gas formed inside the cylinder, or a gas-fuel ratio (G/F) that is a relationship between the total weight G of gas inside the cylinder and a weight F of fuel fed to the cylinder is relatively low, and a rich operating range in which the A/F or G/F is relatively high, wherein when the controller determines that an operating state of the engine body is in the lean operating range, the controller outputs a control signal to the intake air temperature adjuster so that the temperature of the air taken in through the air intake part to the intake passage is increased, as compared with a case when determining that the operating state of the engine body is in the rich operating range, wherein the air intake part includes a first air intake part located forward of the radiator, and a second air intake part located rearward of the radiator and configured to take air into the intake passage after passing through the radiator and exchanging heat with the coolant, wherein the intake air temperature adjuster includes a first intake air adjusting valve configured to adjust a ratio of an amount of air taken in through the first air intake part to the intake passage and a second intake air adjusting valve configured to adjust an amount of air taken in through the second air intake part to the intake passage, operating in an interlocked manner so that an opening of the second intake air adjusting valve becomes smaller as an opening of the first intake air adjusting valve becomes larger, and wherein in the operating range where the engine body performs the CI combustion, when the operating state of the engine body is in the lean operating range, the controller outputs a control signal to the second intake air adjusting valve so that the ratio of the amount of air taken in through the second air intake part to the intake passage is increased, as compared with the case when the operating state of the engine body is in the rich operating range.

4. The intake-air temperature controlling device of claim 3, wherein the intake air temperature adjuster further includes a fluid temperature adjuster configured to adjust a temperature of the coolant flowing into the radiator, and wherein in the operating range where the engine body performs the CI combustion, when the operating state of the engine body is in the lean operating range, the controller outputs a control signal to the fluid temperature adjuster so that the temperature of the coolant circulating the radiator becomes higher, as compared with the case when the operating state of the engine body is in the rich operating range.

5. The intake-air temperature controlling device of claim 3, wherein the intake air temperature adjuster further includes a grille shutter provided forward of the radiator and configured to adjust a flow rate of air taken into an engine bay, and a fan provided rearward of the radiator and forward of the second air intake part and configured to draw air into the engine bay, and wherein in the operating range where the engine body performs the CI combustion, when the operating state of the engine body is in the lean operating range, the controller outputs a control signal to at least one of the grille shutter and the fan so that at least one of an opening of the grille shutter and a rotational speed of the fan is reduced, as compared with the case when the operating state of the engine body is in the rich operating range.

* * * * *